United States Patent
Ueda et al.

(10) Patent No.: US 7,031,820 B2
(45) Date of Patent: Apr. 18, 2006

(54) INTERNAL COMBUSTION ENGINE CONTROLLER

(75) Inventors: Koichi Ueda, Susono (JP); Rentaro Kuroki, Susono (JP); Shozo Yoshida, Shinagawa-ku (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/946,100

(22) Filed: Sep. 22, 2004

(65) Prior Publication Data

US 2005/0071073 A1    Mar. 31, 2005

(30) Foreign Application Priority Data

Sep. 30, 2003   (JP) ............................. 2003-341520
Jan. 26, 2004   (JP) ............................. 2004-016969

(51) Int. Cl.
*G06F 19/00*   (2006.01)

(52) U.S. Cl. ....................... 701/101; 701/103
(58) Field of Classification Search ................ 701/101, 701/102, 103, 105, 110, 114
See application file for complete search history.

(56) References Cited

U.S. PATENT DOCUMENTS

| | | | | |
|---|---|---|---|---|
| 5,964,811 | A | * | 10/1999 | Ishii et al. ................ 701/29 |
| 6,085,132 | A | * | 7/2000 | Ishii et al. ................ 701/29 |
| 6,209,517 | B1 | * | 4/2001 | Yasui .................. 123/339.11 |
| 2005/0071073 | A1 | * | 3/2005 | Ueda et al. ............. 701/101 |

FOREIGN PATENT DOCUMENTS

| | | |
|---|---|---|
| JP | B2 2505304 | 4/1996 |
| JP | A 09-126035 | 5/1997 |
| JP | A 11-107822 | 4/1999 |

* cited by examiner

*Primary Examiner*—John T. Kwon
(74) *Attorney, Agent, or Firm*—Oliff & Berridge, PLC

(57) ABSTRACT

If the combustion status detected in a steady state is partial combustion, the setting of a combustion status control parameter for the next cycle is adjusted so as to provide an increased degree of partial combustion. If, on the other hand, the detected combustion status is fast combustion, the setting of the control parameter for the next cycle is adjusted so as to provide an increased degree of fast combustion. The combustion status can be detected in accordance with an output parameter that correlates with the engine torque.

16 Claims, 15 Drawing Sheets

INTERNAL COMBUSTION ENGINE CONTROLLER

BACKGROUND OF THE INVENTION

1. Field of the Invention

The present invention relates to internal combustion engine control technologies, and more particularly to an internal combustion engine control technology suitable for minimizing the degree of combustion status variation during idling.

2. Background Art

While an internal combustion engine is idle, combustion status varies from one cylinder to another. Therefore, torque variation is likely to occur in the internal combustion engine. Torque variation not only makes the idle revolving speed unstable, but also incurs vibration. A known technology disclosed, for instance, by Japanese Patent No. 2505304 (hereinafter referred to as "Patent Document 1") is used to minimize the degree of torque variation during idling.

The technology disclosed by Patent Document 1 detects the revolution variation of each cylinder during idling. If the magnitude of the revolution variation of a certain cylinder exceeds an upper limit, this technology decreases the injection amount for that cylinder and increases the injection amounts for the other cylinders. If, on the other hand, the magnitude of the revolution variation of a certain cylinder is below a lower limit, the technology increases the injection amount for that cylinder and decreases the injection amounts for the other cylinders. If the increment of the injection amount exceeds a limit when the injection amount is increased, the technology advances the ignition timing. If the decrement of the injection amount is lower than a limit when the injection amount is decreased, the technology delays the ignition timing.

It is conceivable that the above conventional technology produces its effects when a certain degree of combustion variation is caused, for instance, by intake distribution differences amount the cylinders during idling after warm-up.

During idling, particularly cold fast idling immediately after a cold start, the air-fuel ratio is make lean from the viewpoint of fuel efficiency. Further, the ignition timing is delayed from the viewpoint of fuel efficiency and from the viewpoint of catalyst warm-up for exhaust emission control. Consequently, extremely unstable combustion results. Experiments conducted by the inventors of the present invention have revealed that a phenomenon not predicted by the above conventional technology is encountered during cold fast idling during which combustion is extremely unstable.

FIG. 1 is a graph illustrating torque changes of a specific cylinder that occur when no special control is exercised during cold fast idling. In FIG. 1, the torque region between two threshold values (upper and lower threshold values) represents a proper torque region for an idling period. The region above the proper torque region is a fast combustion region, whereas the region below the proper torque region is a partial combustion region. Partial combustion refers to combustion during which no high torque is generated. Fast combustion refers to a combustion during which high torque is generated. In FIG. 1, cycles in the proper torque region are marked by a white circle, whereas cycles outside the proper torque region are marked by a black circle. When the torque decreases due to partial combustion, fast combustion occurs in the affected cylinder in the next cycle so that the torque suddenly increases as indicated in the figure. When, on the other hand, the torque increases due to fast combustion, partial combustion occurs in the affected cylinder in the next cycle so that the torque suddenly decreases.

In partial combustion, the exhaust temperature rises by the amount of fuel energy that is not used for torque generation. Therefore, fast combustion occurs in a cycle next to a partial combustion cycle probably because the ratio of residual gas lowers in the next cycle or the unburned gas temperature rises in the next cycle. It is also conceivable that fast combustion occurs in the next cycle because the equivalent ratio increases in the next cycle due to frequent residual hydrocarbon generation. Partial combustion occurs in a cycle next to a fast combustion cycle for a reason that is contrary to the above-mentioned one. In any case, partial combustion and fast combustion alternately occur during cold fast idling, thereby incurring torque variation.

When the above conventional technology is used, the fuel injection amount, ignition timing, and other control parameters are adjusted so as to decrease the torque of a cylinder if it has a high torque or increase torque of a cylinder if it has a low torque. Therefore, if control is exercised according to the above conventional technology while partial combustion and fast combustion alternately occur as shown in FIG. 1 and if the torque is increased due to fast combustion, the control parameter setting for the next cycle is adjusted to decrease the torque. Therefore, partial combustion in the next cycle is promoted. If, on the contrary, the torque is decreased due to partial combustion, the control parameter setting for the next cycle is adjusted to increase the torque. Therefore, fast combustion in the next cycle is promoted. In other words, even if control is exercised according to the above conventional technology during cold fast idling, combustion status variation cannot be effectively reduced, but the degree of combustion status variation is increased. Combustion status variation may not only incur torque variation to decrease drivability, but also degrade the exhaust gas performance.

SUMMARY OF THE INVENTION

The present invention has been made to solve the above problems and it is an object of the invention is to provide an internal combustion engine controller that is capable of minimizing the degree of combustion status variation.

In accordance with one aspect of the present invention, the combustion status of an internal combustion engine in a steady state is detected. A specific control parameter concerns the combustion status. When the detected combustion status is a partial combustion state, a setting of the control parameter for the next cycle is adjusted so as to provide an increased degree of partial combustion.

In accordance with another aspect of the present invention, the combustion status of an internal combustion engine in a steady state is detected. A specific control parameter concerns the combustion status. When the detected combustion status is a fast combustion state, a setting of the control parameter for the next cycle is adjusted so as to provide an increased degree of fast combustion.

Other objects and further features of the present invention will be apparent from the following detailed description when read in conjunction with the accompanying drawing.

DESCRIPTION OF THE PREFERRED EMBODIMENT

First Embodiment

Figure 2:
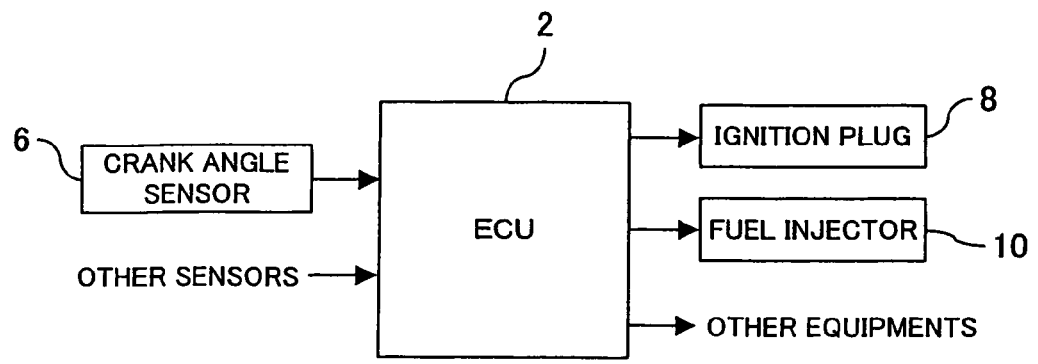
FIG. 2 illustrates the configuration of an internal combustion engine controller according to a first embodiment of the present invention.

A first embodiment of the present invention will now be described with reference to the accompanying drawings. FIGS. 2 through 10 illustrates the first embodiment of an internal combustion engine controller according to the present invention. The internal combustion engine controller according to the present invention serves as an ECU (Electronic Control Unit). In accordance with output signals from a plurality of sensors, the ECU 2 exercises overall control of various equipments that concern the operating status of an internal combustion engine. As shown in FIG. 2, the input end of the ECU 2 according to the present embodiment is connected to a crank angle sensor 6. The output and of the ECU 2 is connected to an ignition plug 8 and a fuel injection valve 10. The crank angle sensor 6 is positioned near a crankshaft to output a signal to the ECU 2 at a predetermined crank angle position. The ECU 2 receives an output signal that is supplied from the crank angle sensor 6, and supplies drive signals to the ignition plug 8 and fuel injection valve 10. The ECU 2 is also connected to a plurality of sensors (e.g., cylinder internal pressure sensor) and equipments in addition to the crank angle sensor 6 and the above-mentioned equipments 8, 10. However, such a plurality of sensors and equipments other than 6, 8 and 10 will not be described herein. The ignition plug 8 and fuel injection valve 10 are provided for each cylinder. For explanation purposes, however, only one ignition plug and one fuel injection valve are described as representatives.

Figure 3:
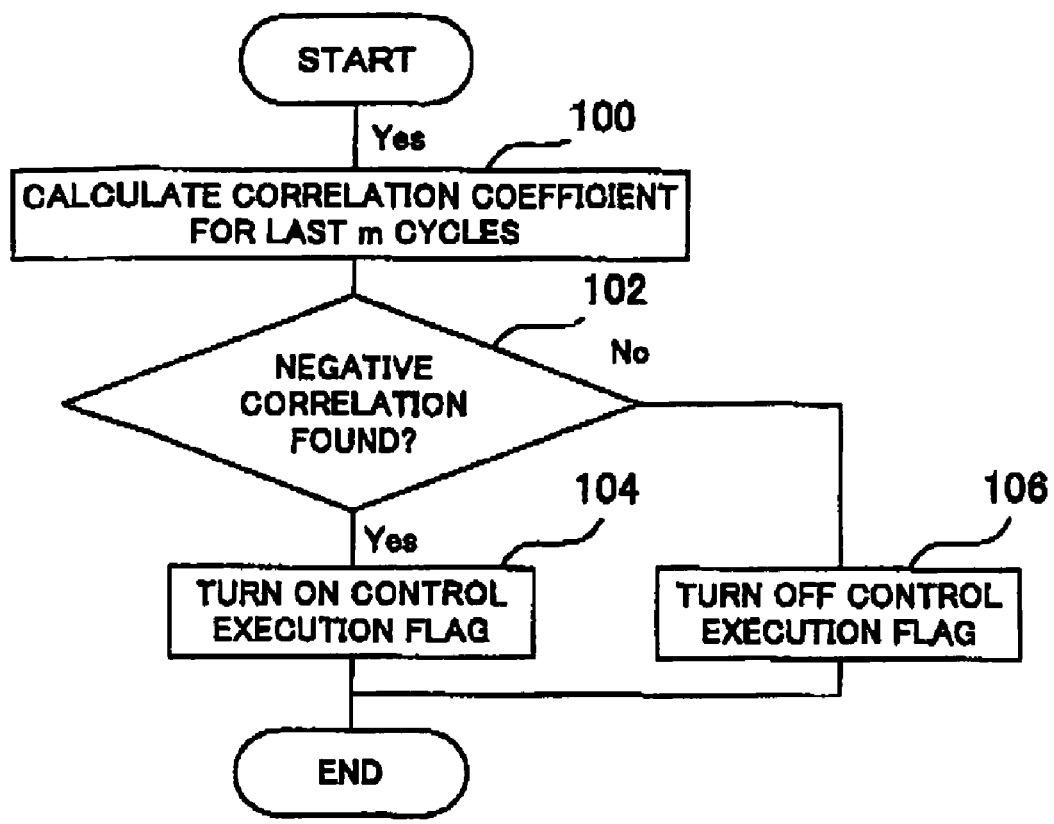
FIG. 3 is a flowchart illustrating a routine for control execution judgment that is executed in accordance with the first embodiment of the present invention.
Figure 4:
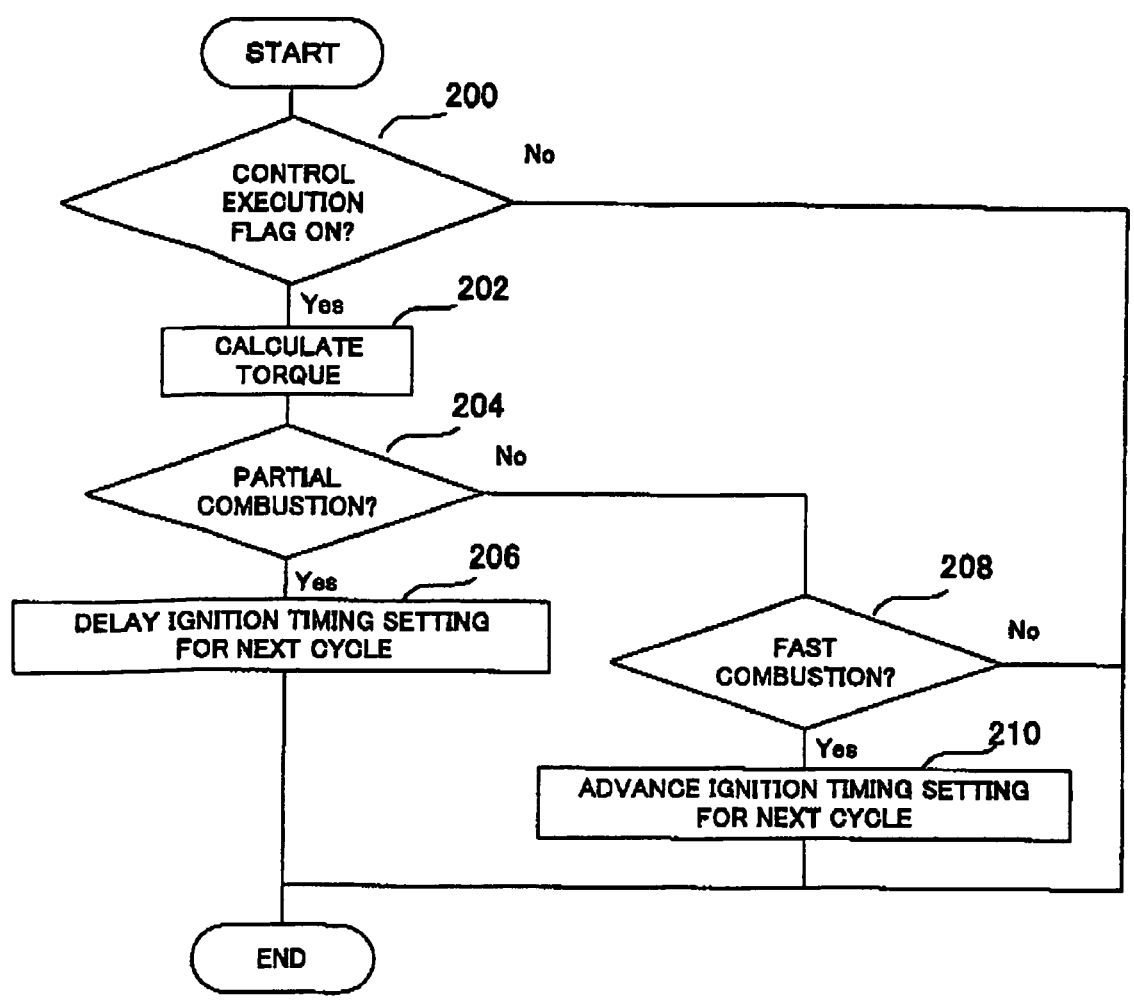
FIG. 4 is a flowchart illustrating a routine for cylinder-specific combustion stabilization control that is executed in accordance with the first embodiment of the present invention.
Figure 5:
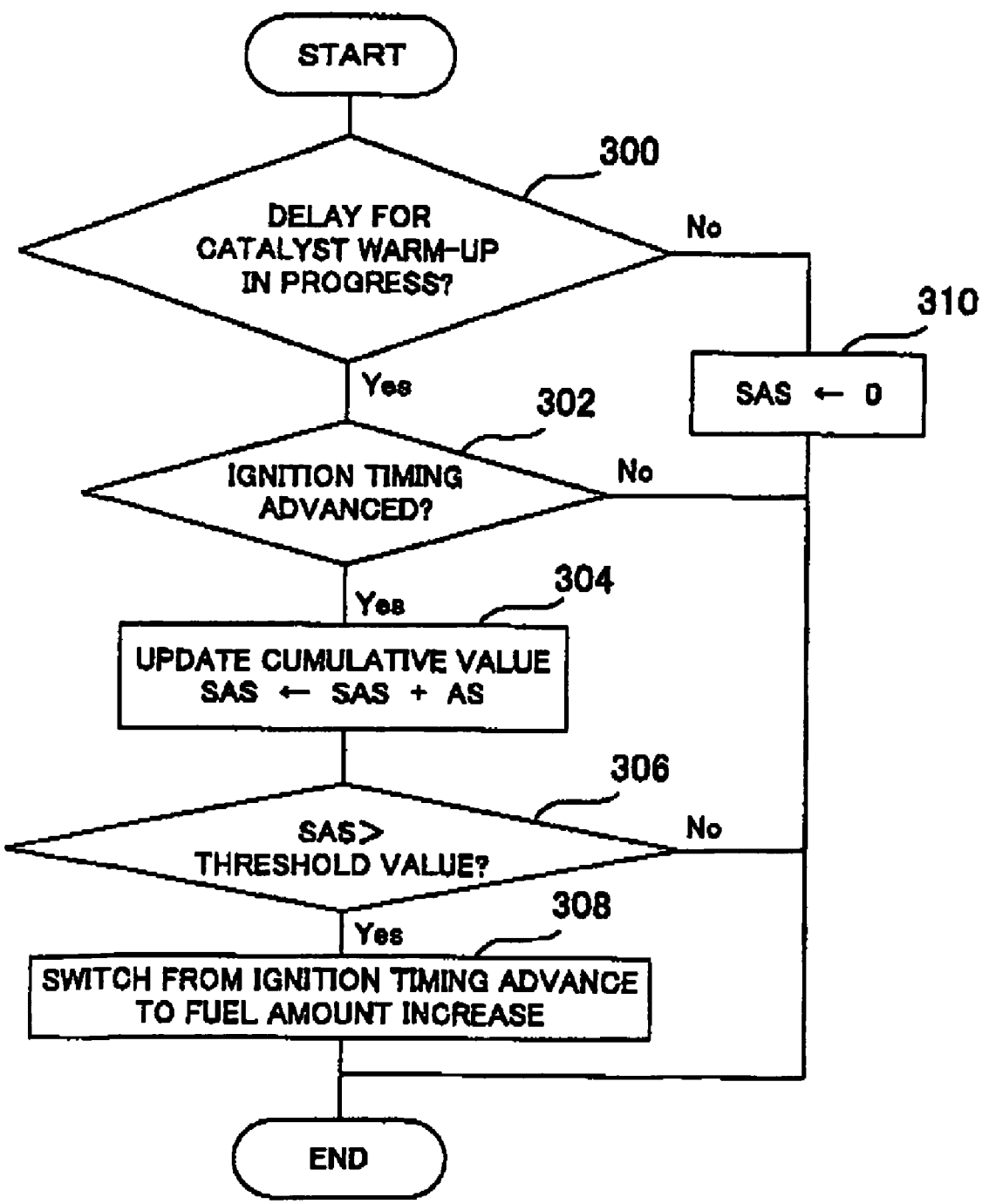
FIG. 5 is a flowchart illustrating a routine for catalyst warm-up effect retention control that is executed in accordance with the first embodiment of the present invention.

FIGS. 3 through 5 are flowcharts illustrating how control is exercised by the ECU 2 according to the present embodiment. In a situation where partial combustion and fast combustion alternately occur during, for instance, cold fast idling, the ECU 2 exercises cylinder-specific combustion stabilization control in which combustion status variation is restrained by assuring stable combustion on an individual cylinder basis. Cylinder-specific combustion stabilization control is exercised to that when partial combustion occurs, the setting of a control parameter for the next cycle is adjusted to provide an increased degree of partial combustion, and then when fast combustion occurs, the setting of a control parameter for the next cycle is adjusted to provide an increased degree of fast combustion. As described earlier, fast combustion is likely to occur in a cycle next to a partial combustion cycle, and it is expected that partial combustion will occur in a cycle next to a fast combustion cycle. It is therefore believed that combustion status variation can be restrained by making control parameter adjustments for combustion stabilization.

More specifically, a judgment is first formulated to determine whether or not to exercise cylinder-specific combustion stabilization control. If a control parameter setting is adjusted as described above in a situation where the combustion status is not significantly varying, the combustion status may become worse. For example, the overall torque may decrease due to internal combustion engine aging, thereby placing the torque in a partial combustion region. If, in such an instance, the control parameter setting for the next cycle is adjusted to provide an increased degree of partial combustion, partial combustion may become promoted, causing a considerable decrease in the torque. Therefore, the ECU 2 executes a routine indicated by the flowchart in FIG. 3 in order to exercise cylinder-specific combustion stabilization control only when the combustion status greatly varies.

FIG. 3 shows a routine (control execution judgment routine) for determining whether cylinder-specific combustion stabilization control is to be exercised. The routine shown in FIG. 3 first calculates a torque correlation coefficient for the last m cycles (e.g., 10 cycles) of each cylinder (step 100). The routine shown in FIG. 3 is executed with predetermined timing on each cycle of each cylinder by using a signal from the crank angle sensor 6 as a trigger. The correlation coefficient calculation operation in step 100 is performed sequentially on all cycles. The torque can be calculated from an output signal (crank angle signal), which is supplied from the crank angle sensor 6. This calculation is performed in accordance with the motion equation.

Equations (1) and (2) below are used to calculate the torque from an output signal that is supplied from the crank angle sensor 6:

$$Ti = J \times (d\omega/dt) + Tf + Tl \quad (1)$$

$$Ti = Tgas + Tinertia \quad (2)$$

The symbol Ti in Equations (1) and (2) represent indicated torque that is generated on a crankshaft due to engine combustion. The right-hand side of Equation (2) shows torque that generates the indicated torque Ti. The right-hand side of Equation (1) shows torque that consumes the indicated torque Ti.

On the right-hand side of Equation (1), the symbol J represents the moment of inertia of a drive member that is driven by air-fuel mixture combustion; $d\omega/dt$, crankshaft angular acceleration; Tf, drive section friction torque; and Tl, load torque that is received from the road surface during a drive. $J \times (d\omega/dt)$ is dynamic loss torque (=Tac), which results from crankshaft angular acceleration. The friction torque Tf is torque of mechanical friction between mating parts such as friction between a piston and a cylinder inner wall. This torque includes torque that results from mechanical friction between auxiliary machines. The load torque Tl is torque that is generated due to disturbance, for instance, from the road surface on which the vehicle moves. Since the gear is in neutral during cold fast idling, the subsequent explanation assumes that Tl=0.

On the right-hand side of Equation (2), the symbol Tgas represents torque that is generated due to the cylinder's internal gas pressure, and the symbol Tinertia represents inertia torque that is generated due to reciprocative inertia mass such as that of a piston. Torque Tgas, which is generated due to the cylinder's internal gas pressure, is generated due to air-fuel mixture combustion in the cylinder. For accurate estimation of combustion status, it is necessary to determine torque Tgas, which is generated due to the cylinder's internal gas pressure.

As shown in Equation (1), the indicated torque Ti can be determined by determining the sum of the dynamic loss torque, which arises out of angular acceleration $J \times (d\omega/dt)$, friction torque Tf, and load torque Tl. However, the indicated torque Ti does not coincide with torque Tgas, which is generated due to the cylinder's internal gas pressure, as shown in Equation (2). Therefore, the combustion status cannot be accurately estimated from the indicated torque Ti.

Figure 8:
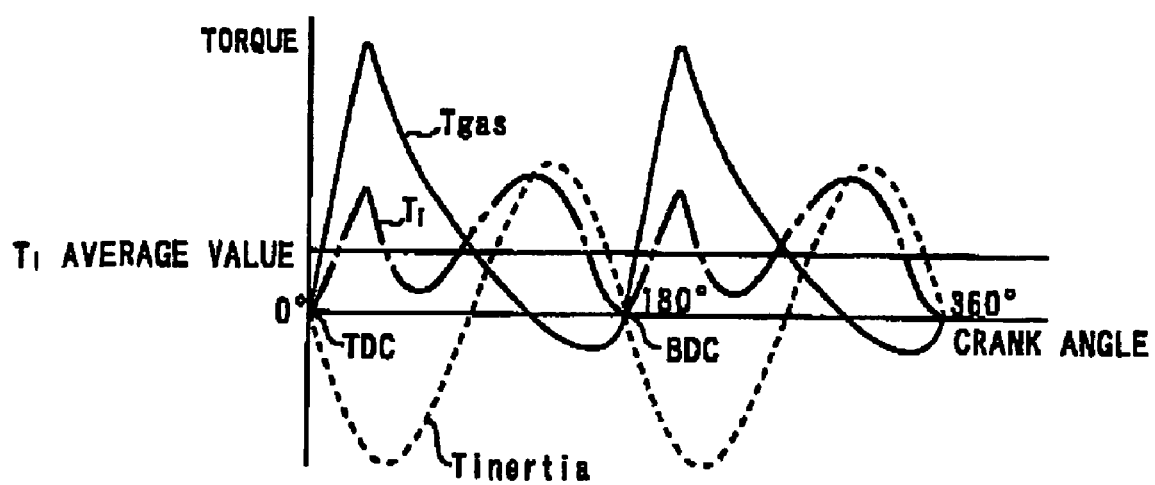
FIG. 8 is a characteristic diagram illustrating the relationship among indicated torque, torque based on cylinder internal gas pressure, inertia torque based on reciprocative inertia mass, and crank angle.

FIG. 8 presents characteristic curves that illustrate the relationship between various torques in Equation (2) and crank angle. In FIG. 8, the vertical axis indicates the magnitude of each torque, whereas the horizontal axis indicates the crank angle. The one-dot chain line in FIG. 8 represents the indicated torque Ti; solid line, torque Tgas, which is generated due to cylinder internal gas pressure; broken line, inertia torque Tinertia, which is generated due to reciprocative inertia mass. FIG. 8 illustrates characteristic curves that prevail when a four-cylinder internal combustion engine is used. The symbols TDC and BDC in FIG. 8 are used to indicate a crank angle (0°, 180°) that prevails when a piston of one of the four cylinders is at the top dead center (TDC) of bottom dead center (BDC). When an internal combustion engine 10 has four cylinders, an explosion process is performed for one cylinder each time the crankshaft rotates 180°. The torque characteristic between the TDC and BDC, which are shown in FIG. 8, repeatedly appears each time an explosion occurs.

As indicated by the solid line in FIG. 8, torque Tgas, which is generated due to cylinder internal gas pressure rapidly increases and decreases between the TDC and BDC. Torque Tgas rapidly increases because the air-fuel mixture explodes in a combustion chamber during an explosion stroke. After explosion, torque Tgas decreases to a negative value through the influence of the other cylinders, which are in a compression stroke or exhaust stroke. When the crank angle later reaches the BDC, the cylinder's capacity change becomes zero so that the value Tgas is 0.

Meanwhile, the inertia torque Tinertia, which is based on reciprocative inertia mass, is generated due to the inertia mass of a piston or other reciprocating members without regard to torque Tgas, which is generated due to cylinder internal gas pressure. The reciprocating members repeatedly accelerate and decelerate. Therefore, while the crank rotates, the inertia torque Tinertia is always generated even if the angular velocity is constant. As indicated by the broken line in FIG. 8, the reciprocating members are stopped when the crank angle is at the TDC so that Tinertia=0. When the crank angle changes from the TDC to the BDC, the reciprocating members, which have been stopped, begin to move. In this instance, the inertia torque Tinertia increases in the negative direction due to the inertia of these members. Since the reciprocating member moves at a predetermined speed when the crank angle is close to 90°, the crankshaft rotates due to the inertia of these members. Therefore, the inertia torque Tinertia changes from a negative value to a positive value between the TDC and BDC. When the crank angle later reaches the BDC, the reciprocating members come to a stop so that Tinertia=0.

As indicated by Equation (2), the indicted torque Ti is the sum of torque Tgas, which is based on cylinder internal gas pressure, and the inertia torque Tinertia, which is based on reciprocative inertia mass. Therefore, the indicated torque Ti exhibits a complex behavior as indicated by the one-dot chain line in FIG. 8. More specifically, the indicated torque Ti increases between the TDC and BDC due to Tgas increase caused by air-fuel mixture explosion, then decreases temporarily, and increases again due to Tinertia.

Within a 180° crank angle region between the TDC and BDC, the average value of the inertia torque Tinertia, which is based on reciprocative inertia mass, is 0. The reason is that the movement of a member having reciprocative inertia mass at crank angles of 0° to 90° is the reversal of the movement of the member at crank angles of 90° to 180°. Therefore, when the torques of Equations (1) and (2) are calculated as an average value between the TDC and BDC, the calculation can be performed so that the inertia torque Tinertia, which is based on reciprocative inertia mass, is equal to zero. This ensures that the influence of the inertia torque Tinertia, which is based on reciprocative inertia mass, upon the indicated torque Ti can be eliminated. Consequently, the precise combustion status can be estimated with ease.

When the average value of each torque between the TDC and BDC is determined, the average value of Tinertia is 0. It is then obvious from Equation (2) that the average value of the indicated torque Ti is equal to the average value of torque Tgas, which is based on cylinder internal gas pressure. It is therefore possible to accurately estimate the combustion status in accordance with the indicated torque Ti.

When the average angular acceleration of the crankshaft between the TDC and BDC is determined, the average value of Tinertia between the TDC and BDC is 0. Therefore, it is possible to determine the angular acceleration with the influence of reciprocative inertia mass upon angular acceleration eliminated. As a result, it is possible to accurately estimate the combustion status in accordance with angular acceleration.

Figure 9:
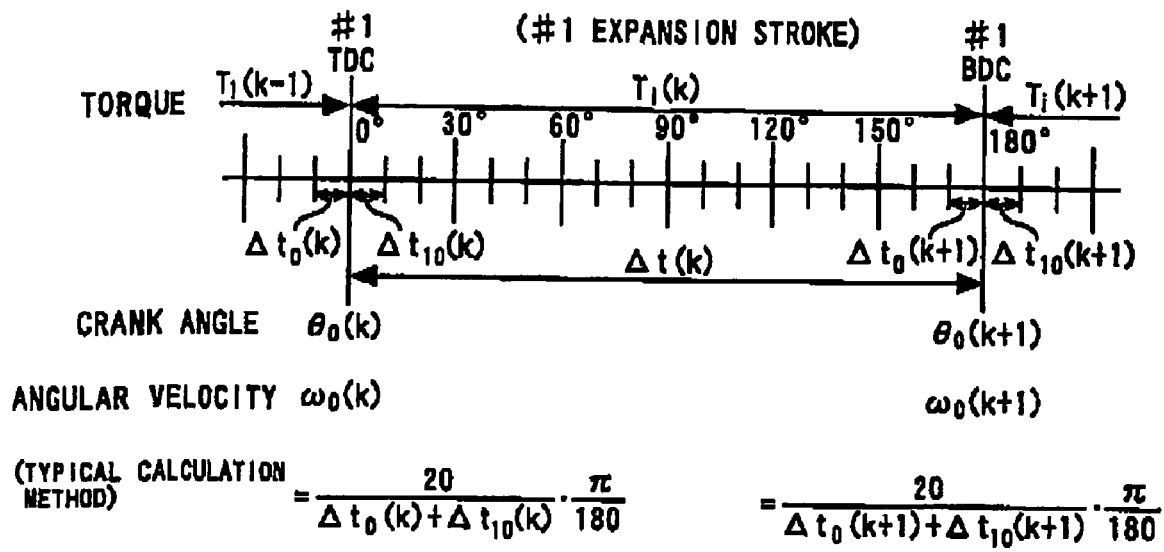
FIG. 9 is a schematic diagram illustrating a crank angle signal and torque calculation timing.

The method for calculating the torques on the right-hand side of Equation (1) will now be described. First of all, the dynamic loss torque ($Tac=J \times (d\omega/dt)$), which arises out of angular acceleration, will be described. FIG. 9 is a schematic diagram illustrating the method for determining the crankshaft angular acceleration. This figure describes a crank angle signal and torque calculation timing. In the present embodiment, the crank angle sensor 6 supplies a crank angle signal each time the crankshaft rotates 10°, as shown in FIG. 9.

The ECU 2 calculates the loss torque Tac, which arises out of angular acceleration, as an average value between the TDC and BDC. Therefore, the apparatus according to the present embodiment determines angular velocities $\omega_0(k)$ and $\omega_0(k+1)$ respectively at two crank angle positions (TDC and BDC) and simultaneously determines the time $\Delta t(k)$ during which the crankshaft rotates from the TDC to the BDC.

When angular velocity $\omega_0(k)$ is to be determined, the crank angle sensor 6 detects time $\Delta t_0(k)$ and time $\Delta t_{10}(k)$ during which the crank angle rotates ±10° from the TDC as, for instance, shown in FIG. 9. The crankshaft rotates 20° during the time $\Delta t_0(k)+\Delta t_{10}(k)$. Therefore, $\omega_0(k)$ [rad/s] can be determined by calculating $\omega_0(k)=(20/(\Delta t_0(k)+\Delta t_{10}(k))) \times (\pi/180)$. Similarly, when $\omega_0(k+1)$ is to be calculated, time $\Delta t_0(k+1)$ and time $\Delta t_{10}(k+1)$ during which the crank angle rotates ±10° from the BDC are detected. Then, $\omega_0(k+1)$ [rad/s] can be determined by calculating $\omega_0(k+1)=(20/(\Delta t_0(k+1)+\Delta t_{10}(k+1))) \times (\pi/180)$. After angular velocities $\omega_0(k)$ and $\omega_0(k+1)$ are determined, $(\omega_0(k+1)-\omega_0(k))/\Delta t(k)$ is calculated to determine the average angular acceleration during a period during which the crankshaft rotates from the TDC to the BDC.

After the average angular acceleration is determined, the average angular acceleration is multiplied by the moment of inertia J in accordance wit the right-hand side of Equation (1). The average value of the dynamic loss torque $J \times (d\omega/dt)$ during a period during which the crankshaft rotates from the TDC to the BDC can then be calculated. The moment of inertia J of the drive section should be predetermined from the inertia mass of drive parts.

Figure 10:
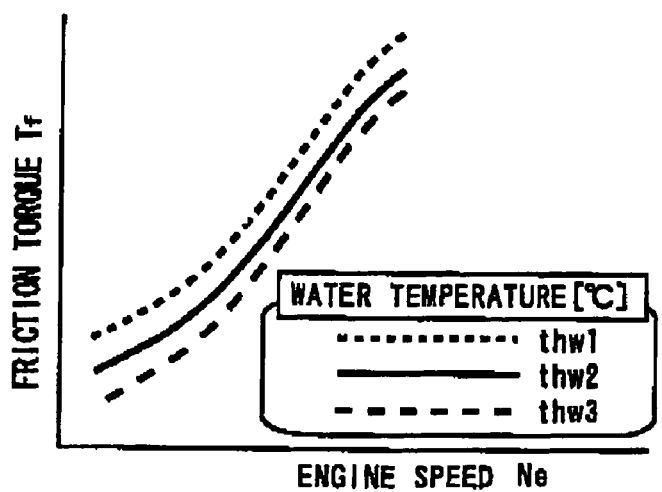
FIG. 10 is a schematic diagram illustrating a map that depicts the relationship among friction torque, engine speed, and cooling water temperature.

The method for calculating the friction torque Tf will now be described. FIG. 10 is a map illustrating the relationship among the friction torque Tf, internal combustion engine speed Ne, and cooling water temperature thw. In FIG. 10, the illustrated friction torque Tf, engine speed Ne, and cooling water temperature thw represent average values that are obtained when the crankshaft rotates from the TDC to the BDC. As regards the cooling water temperature, thw1 is higher than thw2 and thw2 is higher than thw3. As indicted in FIG. 10, the friction torque Tf increases with an increase in the engine speed (Ne) and increases with a decrease in the cooling water temperature thw. The map shown in FIG. 10 is prepared beforehand by varying the engine speed Ne and cooling water temperature thw as parameters, measuring the friction torque Tf that is generated when the crankshaft rotates from the TDC to the BDC, and calculating the average of the measurements taken. When the combustion status is to be estimated, the average value of the friction torque Tf is determined by applying the average cooling water temperature and average engine speed during a period between the TDC and BDC to the map shown in FIG. 10.

The cooling water temperature is detected by a water temperature sensor (not shown), whereas the engine revolving speed is detected by the crank angle sensor 6.

The behavior of the friction torque Tf, which is induced by crank angle variation, is very complicated. The friction torque Tf greatly varies. However, the behavior of the friction torque Tf mainly depends on the piston speed. Therefore, the average value of the friction torque Tf remains almost unchanged in all blocks in which the average value of the inertia torque Tinertia, which is based on reciprocative inertia mass, is 0. Consequently, the friction torque Tf, which exhibits complicated instantaneous behavior, can be accurately determined by determining the average value of the friction torque Tf in each block (TDC→BDC) in which the average value of the inertia torque Tinertia, which is based on reciprocative inertia mass, is 0. Further, when the friction torque Tf is used as the average value for each block, the map shown in FIG. 10 can be accurately prepared.

As described earlier, the friction torque Tf contains torque that arises out of auxiliary machine friction. The value of the torque arising out of auxiliary machine friction varies depending on whether the auxiliary machines operate. For example, the rotation of the engine is transmitted via a belt or the like to an air-conditioner compressor, which is an auxiliary machine. Therefore, friction-induced torque is generated for the air-conditioner compressor even when the air conditioner is not actually operating.

If, on the other hand, an auxiliary machine is operated, that is, the air conditioner switch is turned ON, greater torque is consumed by the compressor than when the air condition is not operating. Therefore, an increased torque is generated by auxiliary machine friction so that the value of the friction torque Tf increases. To accurately determine the friction torque Tf, therefore, it is preferred that the value of the friction torque Tf determined from the map shown in FIG. 10 be corrected when the auxiliary machine operation status is detected with the auxiliary machine switches turned ON.

At the time of extremely cold startup, it is preferred that the friction torque Tf be corrected while considering the difference between the temperature of a section in which friction torque Tf is generated and the cooling water temperature. In this instance, it is preferred that the correction be made in consideration of the engine startup time after cold startup, the amount of the fuel flowing into the cylinder, and the like.

In the present embodiment, the above indicated torque (also referred to as the estimated indicated torque) Ti is used as a representative value of the engine torque. The ECU 2 calculates the torque of each cylinder (indicated torque Ti). The ECU 2 has an internal memory, which stores torque values of the last m cycles. The contents of the memory are updated on each cycle so as to store torque values of m most recent cycles.

Figure 1:
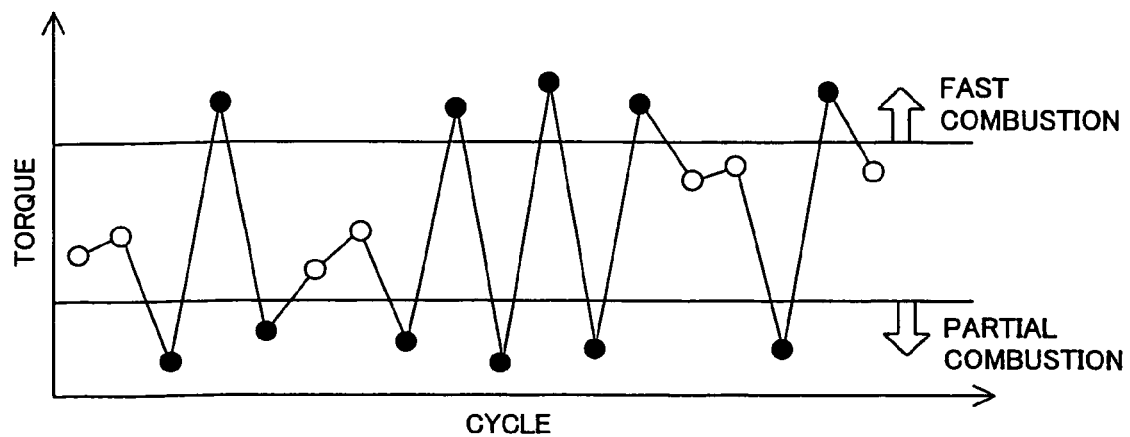
FIG. 1 is a graph illustrating torque changes of a specific cylinder that occurs during cold fast idling using conventional control techniques.
Figure 6:
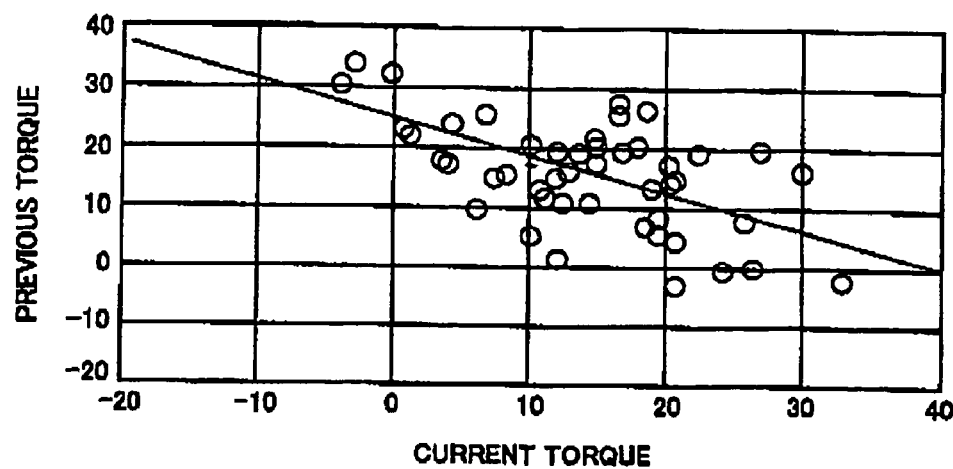
FIG. 6 is a graph illustrating how the torques in the cycles indicated in FIG. 1 correlate with each other.

Combustion status variation can be evaluated with FIG. 6. FIG. 6 is a graph in which the torque values of the last cycle are plotted along the vertical axis whereas the torque values of the current cycle are plotted along the horizontal axis. This graph reveals the correlation between the torque values of different cycles. In a situation where partial combustion and fast combustion alternately occur, remarkable effects are produced by cylinder-specific combustion stabilization control while the combustion status varies. When the torque vertically varies from one cycle to another as shown in FIG. 1, graphed points tend to be arranged from the upper left to the lower right. When the graphed points are arranged from the upper left to the lower right, the correlation coefficient indicates a minus value. As the vertical torque variation of each cycle becomes clearer, graphed points tend to line up and the correlation coefficient decreases accordingly. The minimum correlation coefficient results when all the graphed points are arranged in a single straight line that is drawn from the upper left to the lower right. The resulting minimum correlation coefficient is −1.

In step 102, the correlation coefficient calculated in step 100 is compared against a predetermined threshold value (e.g., −0.6). If the correlation coefficient is smaller than the threshold value, it is concluded that there is a negative correlation among the torque values of the last m cycles. When there is a negative correlation, a control execution flag turns ON (step 104) to exercise cylinder-specific combustion stabilization control. If, on the other hand, there is no negative correlation, the control execution flag turns OFF (step 106) so as not to exercise cylinder-specific combustion stabilization control.

Cylinder-specific combustion stabilization control is exercised by a routine (cylinder-specific combustion stabilization control routine) shown in a flowchart in FIG. 4. The routine shown in FIG. 4 is triggered by a signal from the crank angle sensor 6 and executed when a predetermined period of time elapses after the execution of a routine shown in FIG. 3. In the routine shown in FIG. 4, step 200 is first performed to check whether the control execution flag in ON. Processing steps 202 and beyond are performed only when the control execution flag is ON.

In Step 202, the internal combustion engine torque is calculated. As this torque, the indicated torque can be used which is calculated in accordance with the motion equation for each cylinder from an output signal supplied from the crank angle sensor 6 as described above. If each cylinder of the employed internal combustion engine has a cylinder internal pressure sensor for detecting the pressure within the combustion chamber, the indicated torque may be used which can be calculate from an output signal supplied from the cylinder internal sensor and an output signal supplied from the crank angle sensor 6. As another alternative, the torque may be calculated from changes in the output signal supplied from the crank angle sensor 6 by a known method, that is, calculated from the crank angular velocity.

In the next step 204, the torque value calculated in step 202 is checked to determine whether the combustion status of the internal combustion engine is fast combustion or partial combustion. More specifically, the calculated torque is compared against a predetermined judgment value T1. If the torque is smaller than the judgment value T1, it is concluded that the combustion status in the current cycle is partial combustion. The judgment value T1 is a lower-limit value for the proper torque region. If it is found in step 204 that the combustion status is partial combustion, the ignition timing setting for the next cycle is delayed by a predefined delay compensation amount in order to restrain fast combustion that is expected to occur in the next cycle (step 206).

If it is found in step 204 that the combustion status is not partial combustion, step 108 is performed. In step 208, the combustion status of the internal combustion engine is checked to determine whether it is fast combustion or not. More specifically, the torque calculated in step 202 is compared against a predetermined judgment value T2. If the torque is greater than the judgment value T2, it is concluded that the combustion status of the current cycle is fast combustion. The judgment value T2 is an upper-limit value for the proper torque region and naturally greater than judgment value T1. When it is found in step 208 that the combustion status is fast combustion, the ignition timing setting for the next cycle is advanced by a predefined advance compensation amount in order to restrain partial combustion that is expected to occur in the next cycle (step 210).

If, on the other hand, it is found in step 208 that the combustion status is not fast combustion, it is concluded that the current combustion status is appropriate. In this instance, the current ignition timing setting is continuously used for the next cycle or a setting determined by a factor other than the currently exercised control is used for the next cycle.

The ignition timing setting that is corrected in step 206 or 210 is set for a driver for driving the ignition plug 8 in the next cycle. However, the ignition timing setting that is advanced in step 210 is set as is for the driver for the ignition plug 8 only when predefined conditions are met. The conditions are defined by a routine shown in FIG. 5.

FIG. 5 shows a control routine (catalyst warm-up effect retention control routine) for retaining the catalyst warm-up effect by delaying the ignition timing. A catalyst is positioned in an exhaust path of the internal combustion engine. When the catalyst is at an actively temperature, it purifies the exhaust gas. However, when the internal combustion engine is cold started, the catalyst temperature is significantly lower than the activity temperature. Therefore, the catalyst needs to be quickly heated to the activity temperature after internal combustion engine startup. To raise the catalyst temperature, the exhaust temperature is raised by delaying the ignition timing. In this situation, the ignition timing adjustment for the advance side in step 210 is limited. If the ignition timing is excessively adjusted for the advance side, the exhaust temperature rise effect, which is produced by delaying the ignition timing, is impaired so that the catalyst cannot be quickly warmed up. When the ignition timing is advanced by a predetermined amount, therefore, the routine shown in FIG. 5 adjusts a control parameter other than the ignition timing control parameter, that is adjusts the fuel injection amount setting for the purpose of restraining partial combustion that follows fast combustion.

More specifically, step 300 is first performed to check whether the ignition timing is delayed for catalyst warm-up purposes. Another control routine delays the ignition timing in accordance, for instance, with an output signal generated from an exhaust temperature sensor. The ignition timing delay control is not described herein because it is publicly known. If, for instance, the execution flag for delaying the ignition timing is ON within an ignition timing delay control routine, it is concluded that the ignition timing is delayed.

If it is found in step 300 that the ignition timing is delayed, step 302 is performed to check whether the ignition timing is advanced for correction purposes. If processing step 210 is performed within the routine shown in FIG. 4, it is concluded that the ignition timing is advanced for correction purposes.

If the ignition timing is advanced for correction purposes, step 304 is performed to update the value SAS in accordance with Equation (3) below:

$$SAS = SAS + AS \qquad (3)$$

The left-hand side (SAS) of Equation (3) above is an updated value, whereas the value SAS on the right-hand side is an unupdated value. The cumulative value SAS denotes the amount of correction to the advance side from the base ignition timing (ignition timing setting determined during the above-mentioned delay control), and is updated each time processing step 210 is performed. The advance correction amount AS to be added to the cumulative value SAS is equal to the advance correction amount for use in step 210. If it is found in step 300 that the ignition timing is not delayed or if ignition timing delay control is aborted when the activity temperature is reached by the catalyst, step 310 is performed to reset the cumulative value SAS to zero.

Next, step 306 is performed to check whether the cumulative value SAS is greater than a predetermined threshold value. The catalyst warm-up effect decreases when the ignition timing is advanced for correction purposes. Therefore, the above threshold value is used to define a limit on the cumulative value SAS that adequately produces the catalyst warm-up effect. When the cumulative value SAS is greater than the threshold value, the ignition timing advance for correction comes to a stop. Instead, the fuel injection amount setting for the next cycle is increased by a predetermined amount of increase for correction (step 308).

Performing processing step 308 cancels the advance correction for the ignition timing setting, which is provided in step 210. In the next cycle, the ignition timing setting for the current cycle is set as is for the driver for the ignition plug 8. Further, the fuel injection amount setting that is increased for correction in processing step 208 is set as is for the driver for the fuel injection valve 10 in the next cycle.

If the combustion status of the internal combustion engine turns out to be partial combustion when the above control is exercised, the ignition timing setting for the next cycle is delayed for correction purposes. In the next cycle, therefore, the occurrence of fast combustion can be restrained. If, on the contrary, the combustion status turns out to be fast combustion, the ignition timing setting for the next cycle is advanced for correction purposes. In the next cycle, therefore, the occurrence of partial combustion can be restrained. In other words, the controller according to the present embodiment can restrain combustion status variation within which partial combustion follows fast combustion and fast combustion follows partial combustion. As a result, the controller according to the present embodiment can provide enhanced drivability and improved exhaust purification performance.

Figure 7:
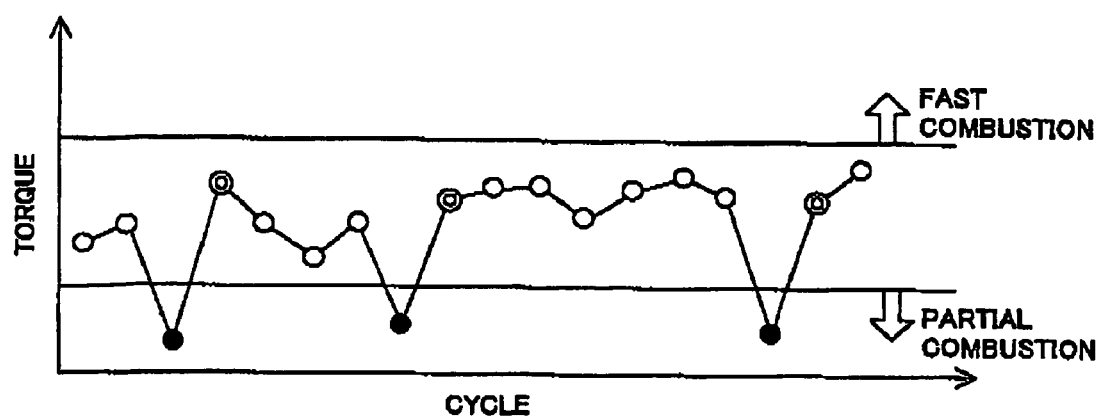
FIG. 7 is a graph illustrating torque changes of a specific cylinder that occur when control according to the present invention is exercised during cold fast idling.

FIG. 7 is a graph illustrating torque changes in a particular cylinder that occur when the above control is exercised during cold fast idling. In FIG. 7, the proper torque region is sandwiched between two threshold values (upper and lower threshold values). The region above the proper torque region is a fast combustion region. The region below the proper torque region is a partial combustion region. In FIG. 7, cycles within the proper torque region are marked by white circles, whereas cycles outside the proper torque region are marked by black circles. In cycles marked by double circles, torque variation is restrained by cylinder-specific combustion stabilization control. The figure indicates that partial combustion is encountered from time to time. However, fast combustion, which follows partial combustion, is properly restrained as indicated in the figure. As is obvious from the comparison with the graph shown in FIG. 1, overall torque variation is reduced to an extremely low level.

If the ignition timing cannot be further advanced from the viewpoint of catalyst warm-up in a situation where the above control is exercised, the fuel injection amount setting for the next cycle is alternatively increased for correction purposes. It is therefore possible to restrain fast combustion from occurring in the next cycle without further advancing the ignition timing. In other words, the controller according to the present embodiment can restrain combustion status variation within which partial combustion follows fast combustion while maintaining the effect of catalyst warm-up delaying the ignition timing.

In the embodiment described above, the combustion status is judged in accordance with torque. Alternatively, however, the combustion status may be judged in accordance with an output parameter other than torque. For example, the combustion ratio, heat generation amount, combustion speed, or other similar output parameter may be used for combustion status judgment. As far as the employed internal combustion engine is provided with a cylinder internal pressure sensor, calculations can be performed in accordance with an output signal generated from the sensor.

In the embodiment described above, the ignition timing is represented by a main control parameter and the combustion status is controlled by mainly adjusting the ignition timing. Alternatively, however, the combustion status may be controlled while the fuel injection amount is represented by the main control parameter. Any combustion status control parameter other than those representing the ignition timing or fuel injection amount may be used to exercise combustion status control. For example, the combustion status may be controlled by adjusting the fuel injection timing. There are two modes of fuel injection: synchronous injection and asynchronous injection. In the synchronous injection mode, fuel injection occurs while the intake valve is open. In the asynchronous injection mode, fuel injection occurs while the intake valve is closed. In the synchronous injection mode, the port wet amount of injection fuel can be reduced to properly supply the fuel to the combustion chamber. This results in a rich air-fuel ratio. Therefore, the air-fuel ratio can be varied to change the combustion status by switching between synchronous injection and asynchronous injection. Further, the fuel injection amount may be varied from one fuel injection operation to another for adjustment purposes by performing a fuel injection operation two times: first in the synchronous injection mode and second in the asynchronous injection mode. If a solenoid drive valve or other means for adjusting the intake amount on an individual cylinder basis is provided, the combustion status may be controlled by adjusting the intake amount.

In the embodiment described above, the control execution judgment routine shown in FIG. 3 is executed on every cycle of each cylinder. Instead of such frequent execution, however, the control execution judgment routine may alternatively be executed for each operation (or upon each cold start). More specifically, a negative correlation in each operation may be checked for to memorize the presence of such a negative correlation, and the control execution flag for the current operation may be set to ON or OFF depending on whether the information memorized during the last operation indicates the presence of a negative correlation.

In the catalyst warm-up effect retention control routine shown in FIG. 5, the cumulative value of the advance correction is used as a condition for switching the control parameter from ignition timing to fuel injection amount. Alternatively, however, another parameter may be used as far as it represents the degree of catalyst warm-up effect reduction caused by a delay in the ignition timing. For example, switching may be performed depending on the corrective advance count. In the routine shown in FIG. 5, the control parameter is switched from ignition timing to fuel injection amount. Alternatively, however, a switch may be made to a control parameter other than the fuel injection amount perimeter as far as partial combustion can be restrained by means of adjustment. For example, a switch may be made, without changing the fuel injection amount, from one asynchronous fuel injection operation to two fuel injection operations, which comprise an asynchronous injection operation and a synchronous injection operation.

In the embodiment described above, two control operations are performed: control for restraining fast combustion subsequent to partial combustion (steps 204 and 206 of the routine shown in FIG. 4) and control for restraining partial combustion subsequent to fast combustion (steps 208 and 210 of the routine shown in FIG. 4). Alternatively, however, only one of these two control operations may be performed. When the correlation between partial combustion and fast combustion is considered, it is conceivable that when either of them is restrained, the remaining one is also restrained.

In the embodiment described above, the routines shown in FIGS. 3 through 5 are executed during cold fast idling. However, control provided by these routines works not only during cold fast idling but also during a period during which the combustion status varies. In other words, combustion status variation can be restrained if the above routines are executed while the combustion status varies. However, when the load varies, for instance, during acceleration or climbing, the combustion status is controlled in accordance with load changes. In such an instance, the combustion status varies as a result of positive control. In this situation, control need not be exercised by the above routines. Control provided by the above routines produced desirable effects while the combustion status varies in a steady state in which the load remains unchanged. In a steady state, therefore, the routine shown in FIG. 3 may be executed, and if the control execution flag turns ON, the routine shown in FIG. 4 may be executed.

In the embodiment described above, various means of various aspects of the present invention are implemented. More specifically, "control parameter adjustment means" is implemented when the ECU 2 performs processing steps 204 and 206; "control parameter adjustment means" is implemented when the ECU 2 performs processing steps 208 and 210; "control parameter adjustment means" is implemented when the ECU 2 performs processing steps 204, 206, 208, and 210; "variation judgment means" is implemented when the ECU 2 performs the routine shown in FIG. 3; "control parameter adjustment means" is implemented when the ECU 2 performs processing steps 304, 306, and 308; "control parameter adjustment means" is implemented when the ECU 2 performs processing steps 302, 304, 306, and 308; and "operating status judgment means" is implemented when the ECU 2 performs processing step 300.

Second Embodiment

A second embodiment of the present invention will now be described with reference to FIG. 11.

Figure 11:
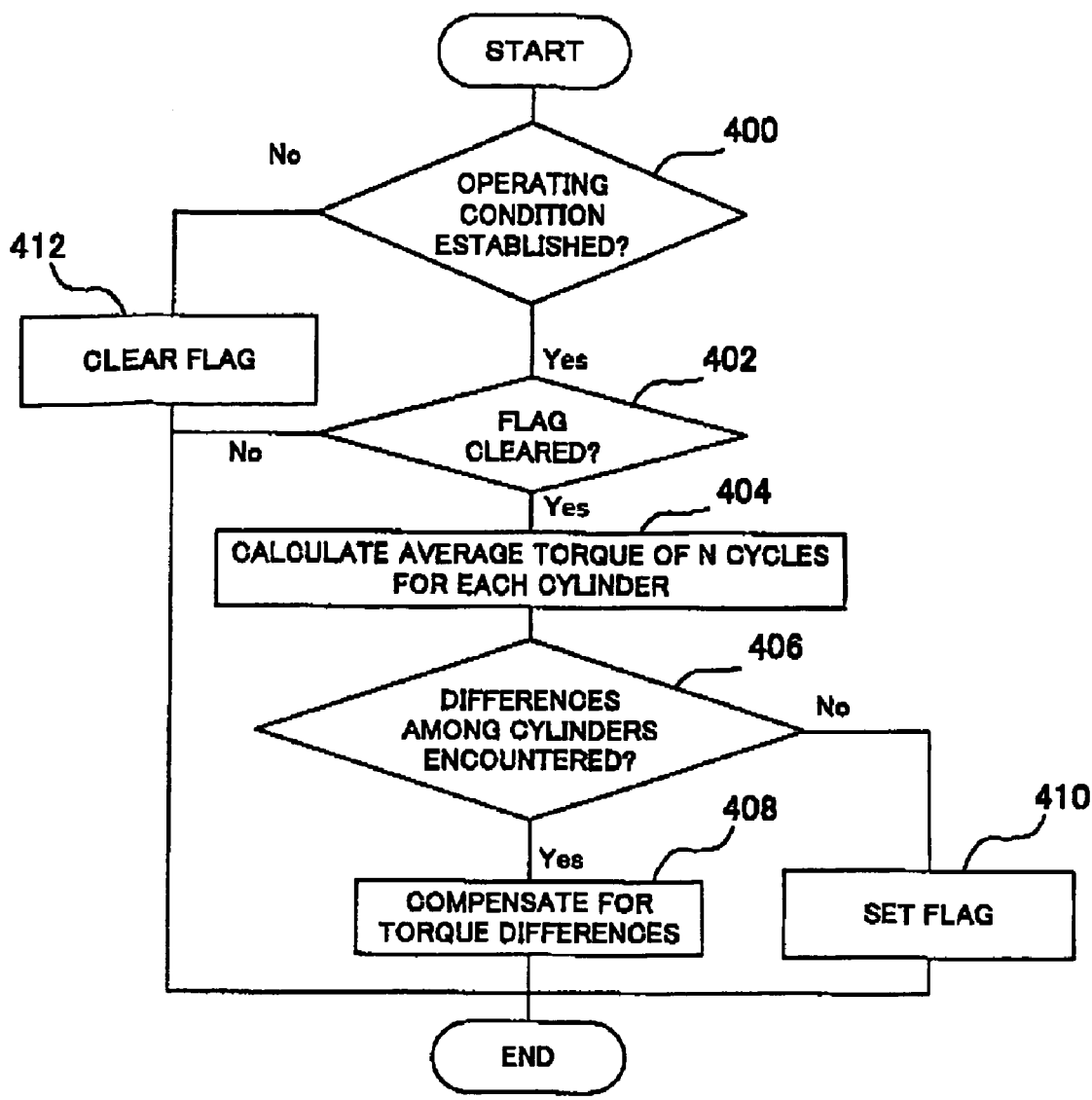
FIG. 11 is a flowchart illustrating a routine for torque difference compensation control that is executed in accordance with a second embodiment of the present invention.

The internal combustion engine controller according to the second embodiment is implemented by causing the ECU 2 according to the first embodiment to additionally perform a routine shown in FIG. 11.

A multicylinder engine, which has a plurality of cylinders, is generally used as an internal combustion engine for use with an automobile or other vehicle. In a multicylinder engine, all the employed cylinders usually have the same structure and are controlled in the same manner. All the cylinders are designed to generated the same torque. In reality and in many cases, however, there are stationary torque differences among the cylinders due, for instance, to differing fuel injection characteristics of injectors, nonuniform intake amounts because, for instance, of tappet clearance differences and intake interference between cylinders, combustion chamber cubic capacity differences among cylinders, and manufactured piston shape differences among cylinders. The stationary torque differences mentioned herein refer to torque differences (e.g., average torque differences) that are encountered when the torque variation from one cycle to another is smoothed.

The above stationary torque differences among cylinders may incur an erroneous judgment of the combustion status (judgment formed in step 204 or 208 of the first embodiment). If, for instance, a particular cylinder steadily has a higher torque than the other cylinders, it may be concluded that the combustion status of the cylinder is fast combustion, because the comparison with a threshold value indicates that the combustion status is outside the proper torque region and in the fast combustion region no matter whether the actual combustion status is proper. On the contrary, it may be concluded that the combustion status of the cylinder is proper, because the comparison with a threshold value indicates that the combustion status is within the proper torque region no matter whether the actual combustion status is fast combustion. To restrain combustion status variation within which partial combustion follows fast combustion and fast combustion follows partial combustion, it is necessary to accurately adjust the ignition timing and other control parameters. For such accurate parameter adjustments, it is important that some means be employed to avoid the above-mentioned erroneous combustion status judgment.

FIG. 11 is a flowchart illustrating a torque difference compensation control routine that is executed by the ECU 2, which serves as an internal combustion engine controller according to the present embodiment. In the present embodiment, the routine (torque difference compensation control routine) shown in FIG. 11 is executed prior to the execution of the routine shown in FIG. 3. In the routine shown in FIG. 11, step 400 is first performed to check whether predefined operating conditions are established. The operating conditions are defined as appropriate internal combustion engine operating conditions for performing a series of combustion stabilization control operations (control operations indicated by the flowcharts in FIGS. 3 through 5), which have been described in conjunction with the first embodiment. The operation conditions applied herein specify that cold fast idling, which immediately follows a cold start, be in progress.

When the operating conditions are established, the program flow proceeds to step 402 and checks whether the combustion stabilization control execution condition flag is set or cleared. The flag is set when the conditions are established for exercising combustion stabilization control by performing processing steps 404 through 408, which are described later. The flag is cleared by default. After the flag is set, it is cleared again when it is found in step 400 that the operating conditions are not established (e.g., when cold fast idling comes to an end) (step 412).

If it is found in step 402 that the flag is cleared, step 404 is performed first to calculate the average torque of the last N cycles for each cylinder. Step 406 is then performed to check for an average torque difference among the cylinders. The torque differences among the cylinders are determined by checking each cylinder for deviation of the average torque from the standard torque (e.g., average torque of all cylinders). If it is found in step 406 that there are torque differences among the cylinders, step 408 is performed to adjust the fuel injection amount and ignition timing of each cylinder so that the torques of all cylinders coincide with the standard torque.

Processing steps 400 through 408 are repeated until the torque differences among the cylinders are eliminated in processing step 408. When the torque differences among the cylinders are eliminated, the program flow follows the "No" route of step 406 and sets the combustion stabilization control execution condition flag (step 410). When the flag is set, the control execution judgment routine shown in FIG. 3 is executed as is the case with the first embodiment.

When the torque difference compensation control routine described above is executed prior to the control execution judgment routine, the combustion status of the internal combustion engine will not be erroneously judged due to stationary torque differences among the cylinders. Therefore, when erroneous judgments arising out of torque differences among the cylinders are avoided, the controller according to the present embodiment can restrain combustion status variation with increased certainty by accurately adjusting the ignition timing, fuel injection amount, and other control parameters.

In the embodiment described above, "torque difference compensation means" is implemented when the ECU 2 performs processing steps 404, 406, and 408.

Third Embodiment

A third embodiment of the present invention will now be described with reference to FIG. 12.

Figure 12:
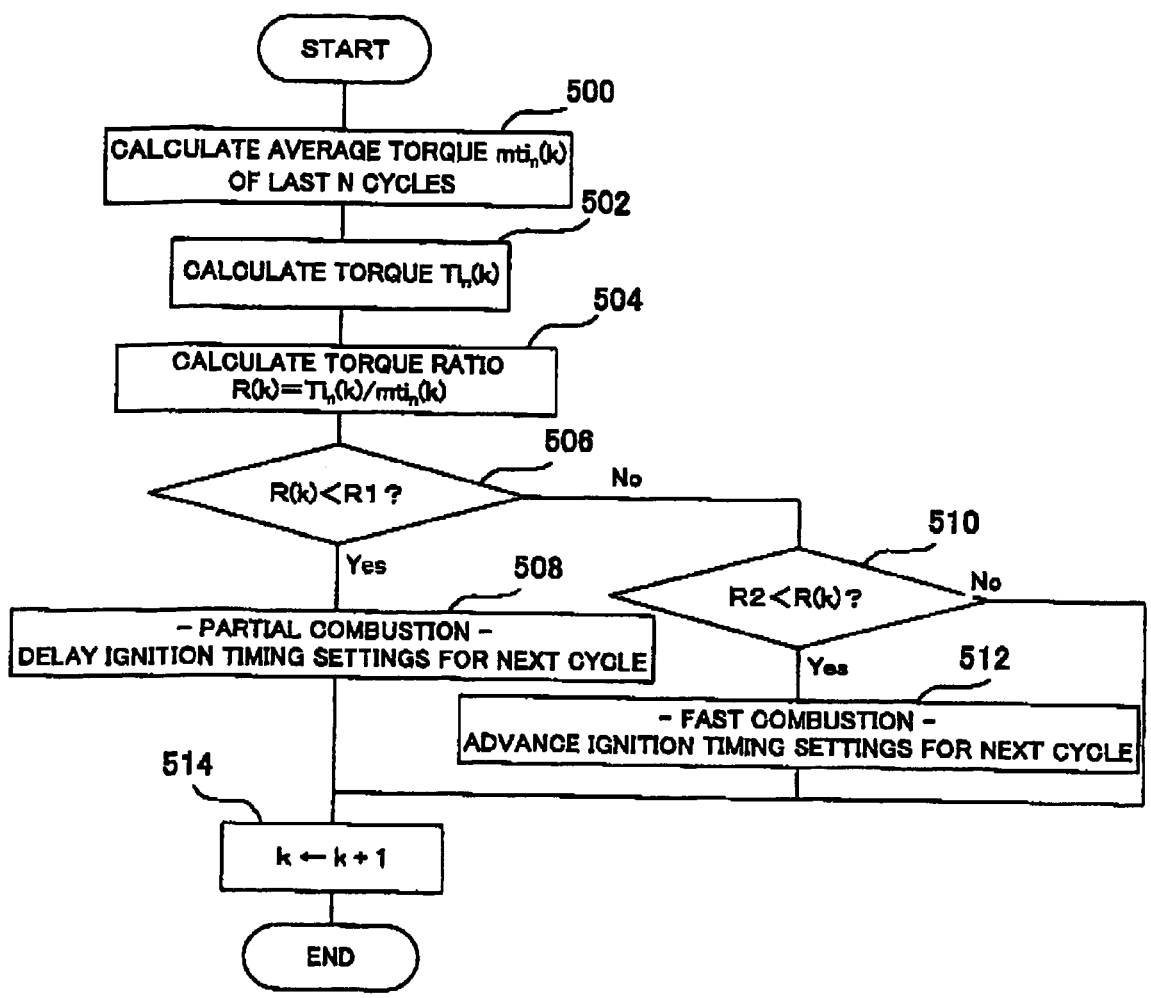
FIG. 12 is a flow chart illustrating a routine for cylinder-specific combustion stabilization control that is executed in accordance with a third embodiment of the present invention.

The internal combustion engine controller according to the third embodiment is implemented by causing the ECU 2 according to the first embodiment to perform a routine shown in FIG. 12 in place of the routing shown in FIG. 4.

In the first embodiment, the indicated torque is estimated from an output signal supplied from the crank angle sensor 6 and compared against predetermined judgment value T1 and T2 to check whether the combustion status of the internal combustion engine is partial combustion or not or whether it is fast combustion or not. However, the reliability of a torque value cannot easily be assured due to, for instance, to friction torque variation, aging, and crank angle sensor signal accuracy. Therefore, if the employed threshold values (judgment values T1 and T2) are the magnitude of torque values as mentioned above erroneous judgments may be formed depending on the reliability of a torque value. In the third embodiment, therefore, the following cylinder-specific combustion stabilization control routine is executed in order to prevent erroneous judgments from being formed due to the reliability of a torque value.

FIG. 12 is a flowchart illustrating a cylinder-specific combustion stabilization control routine that is executed by the ECU 2, which serves as an internal combustion engine controller according to the present embodiment. The routine shown in FIG. 12 is triggered by a signal from the crank angle sensor 6 and executed when a predetermined period of time elapses after the execution of the routine shown in FIG. 3. The routine shown in FIG. 12 also checks whether the control execution flag, which is set in the routine shown in FIG. 3, is ON although such a check is not indicated in the figure. Steps 500 and beyond will be performed only when the control execution flat is ON.

In step 500, the average torque $mti_n(k)$ of the last N cycles is calculated for each cylinder. The ECU 2 has an internal memory, which stores the last N cycles of torque values $Ti_n(k-N)$ to $Ti_n(k-1)$ of each cylinder. The average torque $mti_n(k)$ is calculated as the average of the stored torque values $Ti_n(k-N)$ to $Ti_n(k-1)$. The symbol k, which is within parentheses, represents the number of cycles.

In step 502, each cylinder's torque $Ti_n(k)$ in the current cycle is calculated. As the torque $Ti_n(k)$, the indicated torque, which is calculated from a crank angle time signal in accordance with the motion equation for each cylinder, can be used as is the case with the first embodiment. Alternatively, the indicated torque that is calculated from cylinder internal pressure and crank angle may be used. Another alternative is to calculate the torque from rotational changes in the engine speed as revealed by a publicly known method.

In the next step 504, the ratio of the current torque $Ti_n(k)$ to the average torque $mti_n(k)$, that is, the torque ratio R(k) {$R(k)=Ti_n(k)/mti_n(k)$}, is calculated. In the present embodiment, the torque ration R(k) is used as index for judging whether the combustion status of the internal combustion engine is partial combustion or not or whether it is fast combustion or not.

In step 506, the torque ratio R(k), which is calculated in step 504, is compared against predetermined judgment value R1. Judgment value R1 corresponds to the lower limit of the proper torque region and is set to a value smaller than 1. If the torque ratio R(k) is smaller than judgment value R1, it is concluded that the combustion status of the current cycle is partial combustion. Therefore, step 508 is performed to delay the ignition timing setting for the next cycle in order to restrain fast combustion that is expected to occur in the next cycle. The correction amount for delaying the ignition timing may be left invariable or set to a value that corresponds to the magnitude of the torque ratio R(k) or corresponds to the difference between the torque ratio R(k) and judgment value R1.

If it is found in step 506 that the combustion status is not partial combustion, query step 510 is performed next. In step 510, the torque ratio R(k), which is calculated in step 504, is compared against predetermined judgment value R2. Judgment value R2 corresponds to the upper limit of the proper torque region and is set to a value greater than 1. If the torque ratio R(k) is greater than judgment value R2, it is concluded that the combustion status of the current cycle is fast combustion. Therefore, step 512 is performed to advance the ignition timing setting for the next cycle in order to restrain partial combustion that is expected to occur in the next cycle. The correction amount for advancing the ignition timing may be left invariable or set to a value that corresponds to the magnitude of the torque ratio R(k) or corresponds to the difference between the torque ratio R(k) and judgment value R2.

If it is found in step 510 that the combustion status is not fast combustion, it is concluded that the combustion status is appropriate. In this instance, the current ignition timing setting is continuously used for the next cycle or a setting determined by a factor other than the currently exercised control is used for the next cycle.

After ignition timing setup, the program flow proceeds to step 514. In step 514, the cycle count k is updated by one. Further, the contents of the memory are updated so that the memory stores the torque values of the last N cycles.

When the cylinder-specific combustion stabilization control routine described above is executed, the ratio of the current torque $Ti_n(k)$ to the average torque $mti_n(k)$ is determined. Therefore, the current torque $Ti_n(k)$ is rendered relative by the previous torque values $Ti_n(k-N)$ to $Ti_n(k-1)$. Consequently, the error contained in the current torque $Ti_n(k)$ is offset by previous torque values $Ti_n(k-N)$ to $Ti_n(k-1)$. Since the torque ratio R(k), which is a relative value, is used as an index for judging whether the combustion status of the internal combustion engine is partial combustion or not or whether it is fast combustion or not, the controller according to the present invention prevents an erroneous judgment from being formed due to the reliability of the torque value $Ti_n(k)$. As a result, the controller according to the present invention can restrain combustion status variation with increased certainty by accurately adjusting the ignition timing, fuel injection amount, and other control parameters.

In the embodiment described above, the average value of torque values $Ti_n(k-N)$ to $Ti_n(k-1)$ in the last N cycles is calculated as the average torque $mti_n(k)$. Alternatively, however, torque values of cycles that are found to be in the fast combustion category or partial combustion category may be excluded from average value calculation. When this alternative method is used, it is possible to restrain the value of the average torque $mti_n(k)$ from varying from one cycle to another, Another alternative is to perform a filtering process for the purpose of restraining the average torque $mti_n(k)$ from varying from one cycle to another.

In the embodiment described above, the torque ratio $R(k)$ is used for combustion status determination. Alternatively, however, the difference between the current torque $Ti_n(k)$ and the last torque $Ti_n(k-1)$ may be used for combustion status determination. When the current torque $Ti_n(k)$ is rendered relative by a previous torque value, the error contained in the current torque $Ti_n(k)$ is offset by the previous torque value. It is therefore possible to prevent an erroneous judgment from being formed due to the reliability of the torque value $Ti_n(k)$. The combustion status can also be determined in accordance with an output parameter other than torque, such as combustion ratio, heat generation amount, or combustion speed. In such an instance, too, the detected output parameter value should be rendered relative by a previously detected value in order to determine the combustion status from the detected value that is rendered relative.

Cylinder-specific combustion stabilization control according to the foregoing embodiment can be combined with catalyst warm-up effect retention control, which is illustrated in the flowchart in FIG. 5, as is the case with the first embodiment although such a combination will not be described herein. Cylinder-specific combustion stabilization control according to the foregoing embodiment can also be combined with torque difference compensation control according to the second embodiment.

In the embodiment described above, "combustion status detection means" is implemented when the ECU 2 performs processing steps 500, 502, 504, 506, and 510. Further, "control parameter adjustment means" is implemented when the ECU 2 executes the routine shown in FIG. 12.

Fourth Embodiment

A fourth embodiment of the present invention will now be described with reference to FIG. 13.

Figure 13:
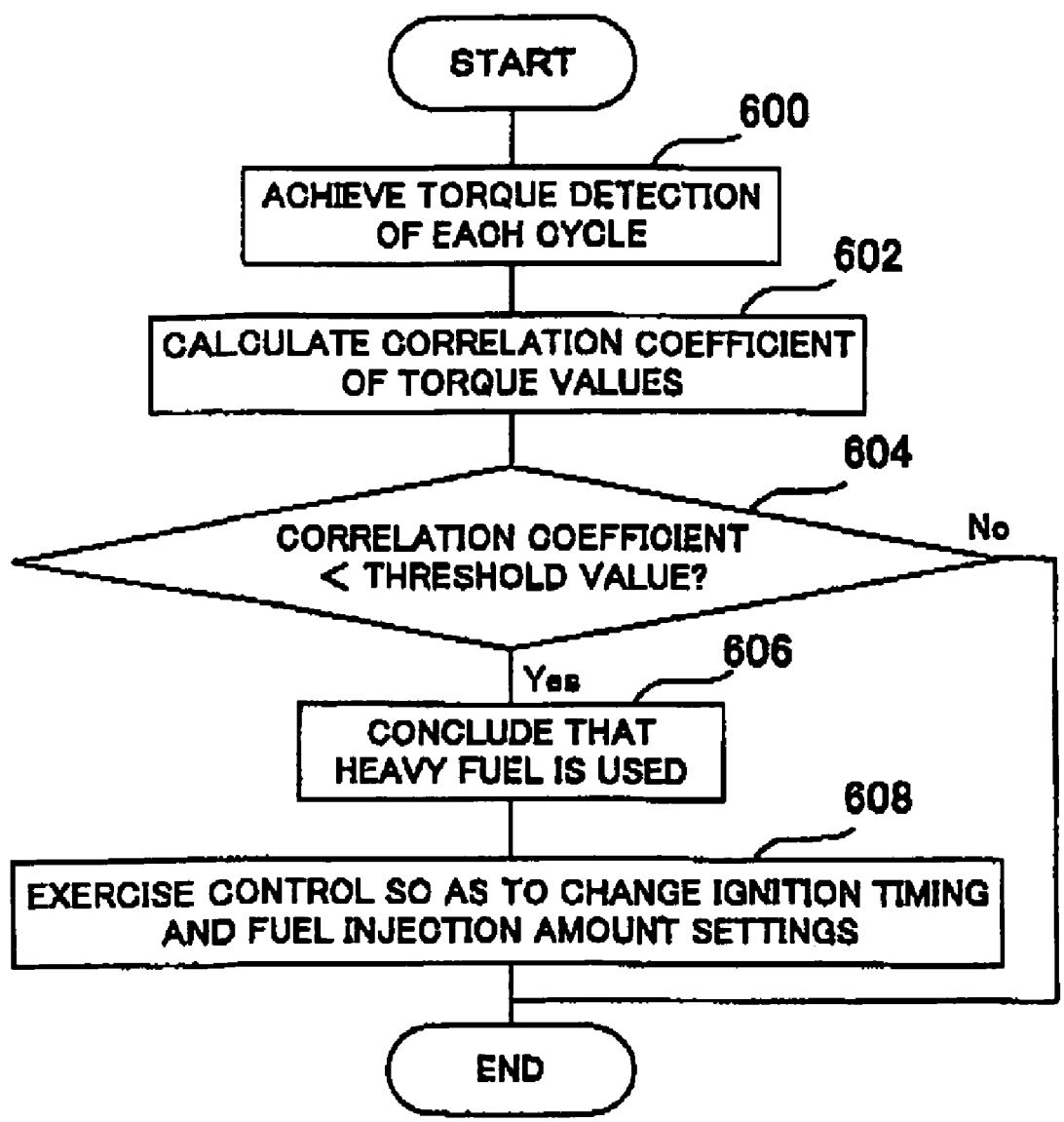
FIG. 13 is a flowchart illustrating a routine for cylinder-specific combustion stabilization control that is executed in accordance with a fourth embodiment of the present invention.

The internal combustion engine controller according to the fourth embodiment is implemented by causing the ECU 2 according to the first embodiment to perform a routine shown in FIG. 13 in place of the routines shown in FIGS. 3 through 5.

In some cases, heavy fuel may be used as internal combustion engine fuel. Heavy fuel is less volatile than commonly used fuel (light fuel). When heavy fuel is used, an increased amount of fuel sticks to the inner wall surface of an intake port or the surface of an intake valve. Therefore, the air-fuel ratio tends to be lean. The air-fuel ratio is considerably lean particularly during cold fast idling during which the wall surface temperature is low because the fuel stuck on the wall surface does not readily vaporize. While cold fast idling is in progress, the air-fuel ratio is generally rendered lead form the viewpoint of fuel efficiency, and the ignition timing is delayed for catalyst warm-up from the viewpoint of fuel efficiency and exhaust emission control. However, if such control is exercised during the use of heavy fuel, the torque suddenly decreases so that degraded drivability results. To avoid drivability degradation, therefore, the control to be exercised during the use of heavy fuel needs to be different from the control exercised during the use of common fuel. Since unstable combustion results to incur an increased degree of torque variation during the use of heavy fuel, the present embodiment uses the following means to determine the fuel properties and exercises combustion stabilization control in accordance with the determined fuel properties.

FIG. 13 is a flow chart illustrating a cylinder-specific combustion stabilization control routine that is executed by the ECU 2, which serves as an internal combustion engine controller according to the present embodiment. As is the case with the first embodiment, cylinder-specific combustion stabilization control according to the present embodiment is also exercised during cold fast idling during which combustion is likely to become unstable.

First of all, step 600 is performed to achieve torque detection of each cycle for each cylinder. Torque detector is performed on a predetermined number of cycles (e.g., 10 cycles). The torque detection method (calculation method) to be employed may be the same as described in conjunction with the first embodiment. An internal memory of the ECU 2 stores detected torque values.

Next, step 602 is performed to calculate the correlation coefficient of torque values in a predetermined number of previous cycles. When the torque values vertically vary from one cycle to another in a situation where a graph is prepared to plot the torque values derived from a previous cycle along the vertical axis and plot the torque values derived from the current cycle along the horizontal axis, graphed points tend to be arranged from the upper left to the lower right as shown in FIG. 6. If the negative gradient is great, it means that combustion is unstable and that heavy fuel is used. When the correlation coefficient indicates a minus value and the vertical torque variation of each cycle becomes clearer, graphed points tend to line up and the correlation coefficient decreases accordingly.

In step 604, the correlation coefficient calculated in step 602 is compared against a predetermined threshold value (minus value). If the correlation coefficient is smaller than the threshold value, it is concluded that heavy fuel is used (step 606). In this instance, the ignition timing and fuel injection amount settings, which are torque-related control parameters, are changed as appropriate for the use of heavy fuel (step 608). More specifically, step 608 is performed to advance the ignition timing and increase the fuel injection amount so as to provide a rich air-fuel ratio. During cold fast idling, heavy fuel does not readily vaporize so that engine flameout is likely to occur. Therefore, when the ignition timing and fuel injection amount settings are changed as mentioned above, combustion stabilizes to prevent drivability from being degraded by a sudden torque decrease.

When the cylinder-specific combustion stabilization control routine is executed as described above to determine the fuel properties from the torque correlation among a plurality of previous cycles, it is possible to accurately determine the fuel properties without using any special sensor. If heavy fuel is used, the ignition timing and fuel injection amount settings are switched from normal ones to those appropriate for heavy fuel. As a result, combustion can be stabilized to avoid drivability degradation.

In the embodiment described above, "fuel property determination means" is implemented when the ECU 2 performs processing steps 600, 602, and 604.

Fifth Embodiment

A fifth embodiment of the present invention will now be described with reference to FIGS. 14 and 15.

Figure 14:
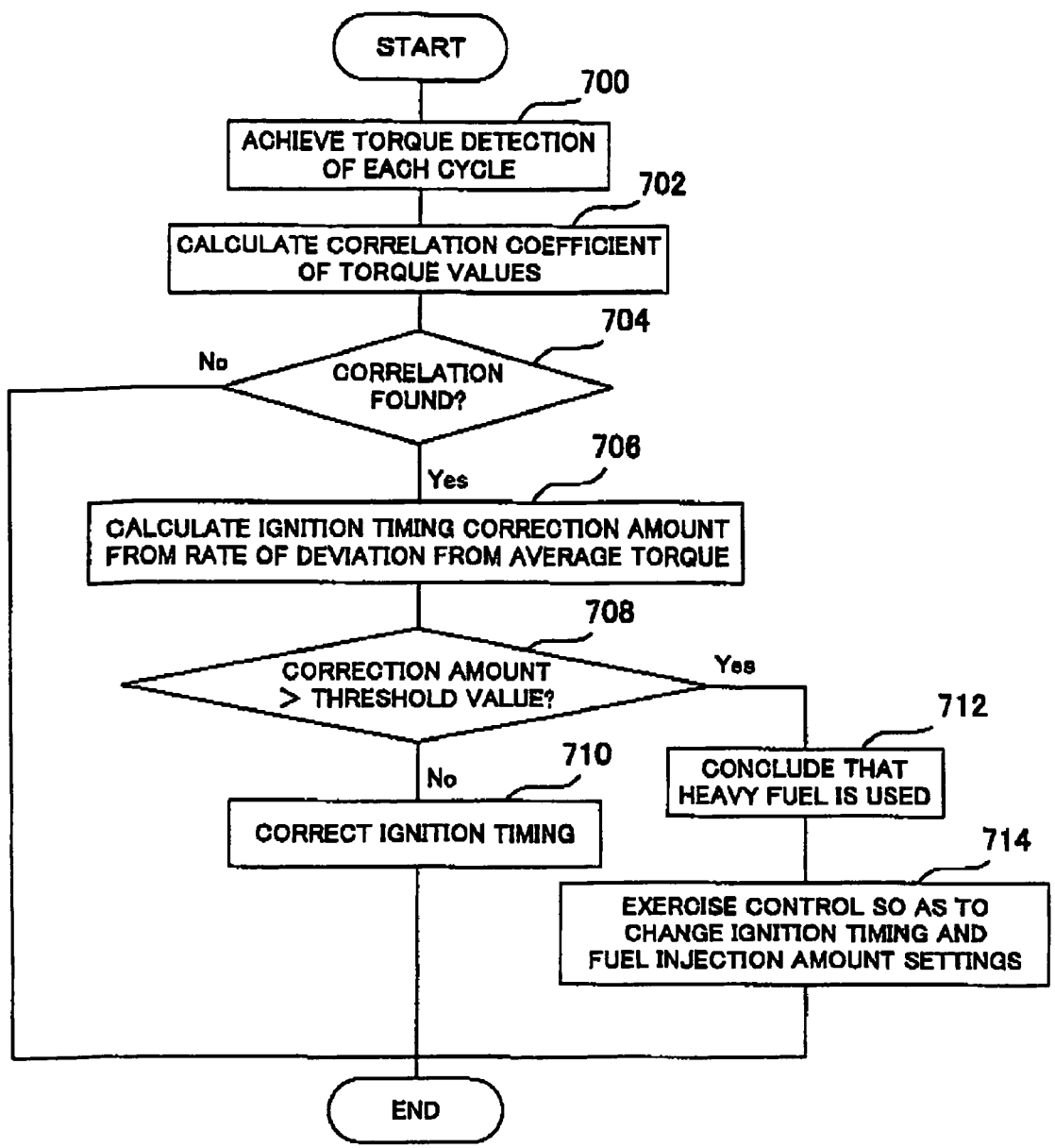
FIG. 14 is a flowchart illustrating a routine for cylinder-specific combustion stabilization control that is executed in accordance with a fifth embodiment of the present invention.
Figure 15:
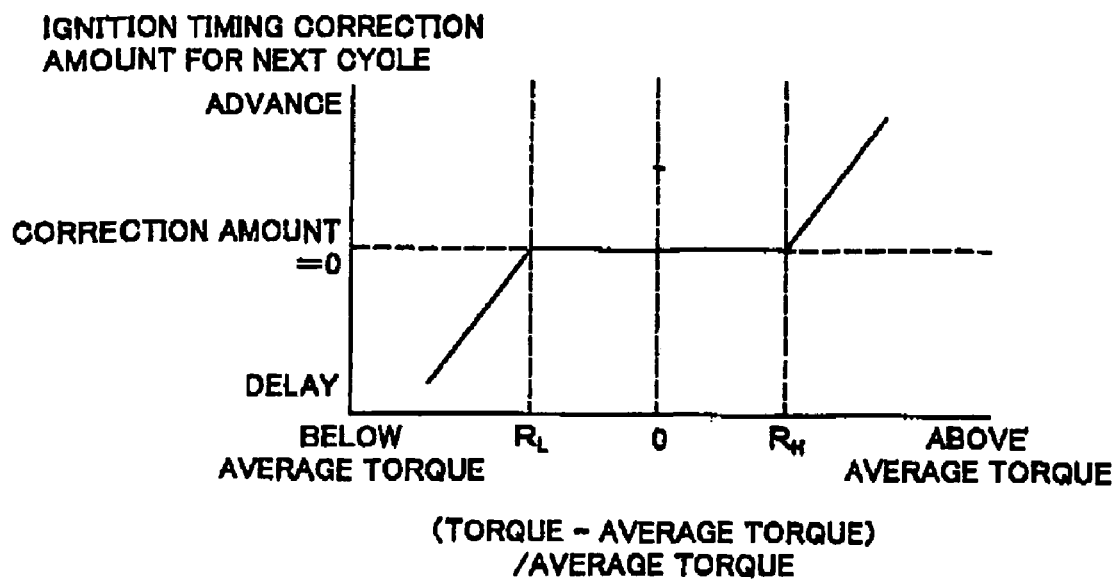
FIG. 15 is a map for calculating the ignition timing correction amount from the deviation of the current torque from the average torque.

The internal combustion engine controller according to the fifth embodiment is implemented by causing the ECU 2 according to the first embodiment to perform a routine shown in FIG. 14 in place of the routines shown in FIGS. 3 through 5.

Cylinder-specific combustion stabilization control according to the present embodiment is a combination of the first embodiment, in which a control parameter setting is adjusted depending on whether the combustion status is partial combustion or fast combustion, and cylinder-specific combustion stabilization control according to the fourth embodiment, in which a control parameter setting is changed in accordance with the fuel properties. In the fourth embodiment, the fuel quality is determined from the torque correlation among a plurality of previous cycles. In the present embodiment, on the other hand, the fuel properties are determined from the amount of adjustment made to a control parameter setting.

FIG. 14 is a flowchart illustrating a cylinder-specific combustion stabilization control routine that is executed by the ECU 2, which serves as an internal combustion engine controller according to the present embodiment. As is the case with the first embodiment, cylinder-specific combustion stabilization control according to the present embodiment is also exercised during cold fast idling during which combustion is likely to become unstable.

First of all, step 700 is performed to achieve torque detection of each cycle for each cylinder. Torque detection is performed on a predetermined number of cycles. An internal memory of the ECU 2 stores detected torque values. Next, step 702 is performed to calculate the correlation coefficient of torque values in a predetermined number of previous cycles. The correlation coefficient is as described earlier. In step 704, the correlation coefficient calculated in step 702 is compared against a predetermined threshold value (minus value). If the correlation coefficient is smaller than the threshold value, it is concluded that there is a negative correlation among torque values in a plurality of previous cycles.

If it is concluded in step 704 that there is a negative correlation, processing step 706 is performed. In step 706, the average of the torque values in a plurality of previous cycles is first calculated to determine the rate of deviation of the current torque from the average torque (by subtracting the average torque from the current torque and dividing the obtained value by the average torque). The map shown in FIG. 15 is then used to calculate the ignition timing correction amount that is appropriate for the rate of deviation. In FIG. 15, the horizontal axis indicates the rate of deviation, whereas the vertical axis indicates the amount of ignition timing correction. The rate of deviation is 0 when the current torque is equal to the average torque. In the map, the region in which the rate of deviation is between $R_L$ ($R_L<0$) and $R_H$ ($R_H>0$) is a dead zone. In the dead zone, the ignition timing correction amount is zero. This dead zone corresponds to the proper torque region. The values $R_L$ and $R_H$ respectively correspond to the lower- and upper-limit values of the proper torque region. When the rate of deviation is greater than $R_H$, the ignition timing correction amount is set for an increase toward the advance side in proportion to an increase in the rate of deviation. When the rate of deviation is smaller than $R_L$, the ignition timing correction amount is set for an increase toward the delay side in proportion to a decrease in the rate of deviation.

In step 708, the ignition timing correction amount calculated in step 706 is compared against a predetermined threshold value (plus value). This threshold value is used to determine from the ignition timing correction amount whether the fuel properties indicate heavy fuel. If the fuel properties indicate heavy fuel, great torque variation occurs. Thus, the map shown in FIG. 15 is used to set a great ignition timing correction amount. If the ignition timing correction amount exceeds the predetermined threshold value, it can therefore be concluded that the fuel properties indicate heavy fuel.

If it is found in step 708 that the ignition timing correction amount is not greater than the threshold value, the ignition timing is corrected in the next cycle (step 710). If, on the other hand, the ignition timing correction amount is greater than the threshold value, it is concluded that heavy fuel is used (step 712). In this instance, step 714 is performed to change the ignition timing and fuel injection amount settings, which are torque-related control parameters, as appropriate for the use of heavy fuel. More specifically, the ignition timing is adjusted for the advance side and the fuel injection amount is increased to provide a rich air-fuel ratio. At cold start, heavy fuel does not readily vaporize so that engine flameout is likely to occur. Therefore, when the ignition timing and fuel injection amount settings are changed as described above, combustion stabilizes to prevent drivability from being degraded by a sudden torque decrease.

When the cylinder-specific combustion stabilization control routine is executed as described above during the use of common light fuel, the ignition timing setting for the next cycle is adjusted in accordance with the rate of deviation of the current torque from the average torque. Therefore, torque variation can be immediately restrained. If heavy fuel is used, on the other hand, the ignition timing and fuel injection amount settings are changed from the normal ones to those appropriate for the use of heavy fuel. Combustion can therefore be stabilized to prevent drivability from being degraded. Further, when the ignition timing setting for the next cycle is adjusted in accordance with the rate of deviation, the fuel properties are determined from the amount of adjustment. Therefore, the present embodiment is at an advantage in that the fuel properties can be accurately determined without using any special sensor.

In the embodiment described above, "control parameter adjustment means" is implemented when the ECU 2 performs processing step 706. Further, "fuel property determination means" is implemented when the ECU 2 performs processing step 708.

Sixth Embodiment

A sixth embodiment of the present invention will now be described with reference to FIG. 16.

Figure 16:
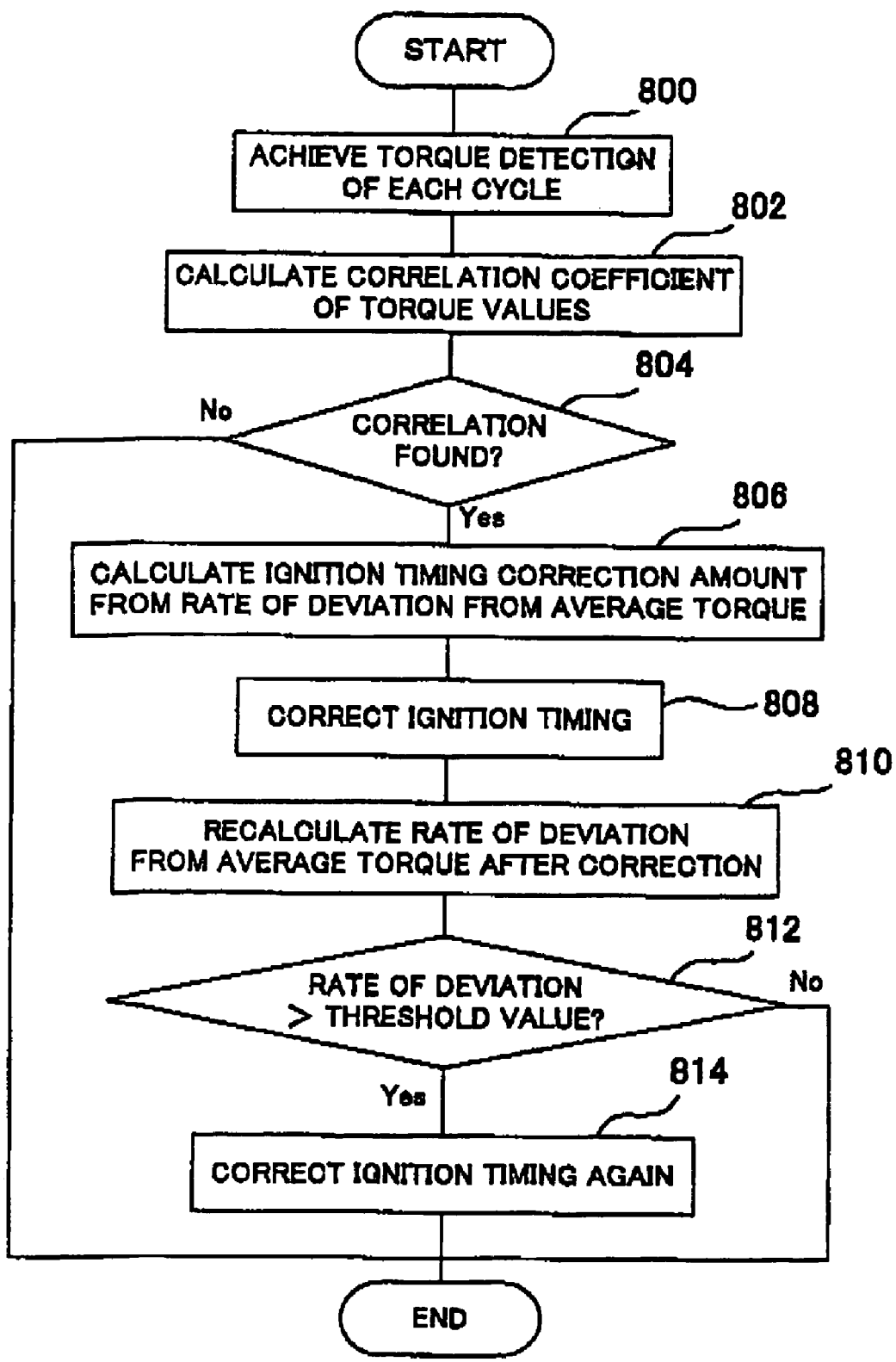
FIG. 16 is a flowchart illustrating a routine for cylinder-specific combustion stabilization control that is executed in accordance with a sixth embodiment of the present invention.

The internal combustion engine controller according to the sixth embodiment is implemented by causing the ECU 2 according to the first embodiment to perform a routine shown in FIG. 16 in place of the routines shown in FIGS. 3 through 5.

When the map is used to preset the ignition timing correction amount according to the rate of deviation of the current torque as described in conjunction with the fifth embodiment, torque variation can be immediately restrained. However, the optimum ignition timing correction amount for a specific rate of deviation greatly varies due, for instance to inherent variations from one unit of the internal combustion engine to another inaccurate adjustment, aging, and differences in operating conditions. Therefore, even when the ignition timing correction amount is determined in accordance with the map to adjust the ignition timing setting for the next cycle, torque variation may not always be within a permissible range. Under these circumstances, the present embodiment exercises the following cylinder-specific combustion stabilization control in order to properly restrain torque variation without regard, for instance, to inherent variations from one unit of the internal combustion engine to another.

FIG. 16 is a flowchart illustrating a cylinder-specific combustion stabilization control routine that is executed by the ECU 2, which serves as an internal combustion engine controller according to the present embodiment. As is the case with the first embodiment, cylinder-specific combustion stabilization control according to the present embodiment is also exercised during cold fast idling during which combustion is likely to become unstable. Processing steps 800 through 804 are not described herein because they are identical with processing steps 700 through 704 according to the fourth embodiment.

Step 806 is performed to calculate the average of torque values in a plurality of previous cycles and than the rate of deviation of the current torque from the average torque. The map (map shown in FIG. 15) is then used to calculate the ignition timing correction amount in accordance with the rate of deviation. Next, step 808 is performed in the next cycle to correct the ignition timing in accordance with the ignition timing correction amount calculated from the map.

In the cylinder-specific combustion stabilization control routine according to the present embodiment, the average of torque values in a plurality of previous cycles is calculated again after ignition timing correction. The rate of deviation of the current torque from the average torque is then calculated (step 810). In the next step 812, the rate of deviation calculated in step 810 is compared against a predetermined threshold value. If it is found that the rate of deviation is greater than the threshold value, that is, the torque variation is not within the permissible range, the map is used again to calculate the ignition timing correction amount according to the rate of deviation. The ignition timing is then corrected in the next cycle in accordance with the calculated ignition timing correction amount (step 814). The maximum and minimum values are predefined for the ignition timing correction amount although they are not indicated in the figure. These maximum and minimum values prevent the ignition timing from being excessively corrected.

If torque variation is not within the permissible range after the cylinder-specific combustion stabilization control routine described above is executed to correct the ignition timing, the ignition timing is corrected again depending on the encountered torque variation. Therefore, torque variation can be properly restrained without regard, for instance, to internal combustion engine aging or inherent variations from one unit of the internal combustion engine to another. The number of ignition timing recorrections is not limited to one. The ignition timing may be repeatedly recorrected until the encountered torque variation is within the permissible range.

If the fuel properties determined from the ignition timing correction amount, which is calculated in step 806, indicate that heavy fuel is currently used, the present embodiment may change the ignition timing and fuel injection amount settings as appropriate for the use of heavy fuel as is the case with the fifth embodiment.

Seventh Embodiment

A seventh embodiment of the present invention will now be described with reference to FIG. 17.

Figure 17:
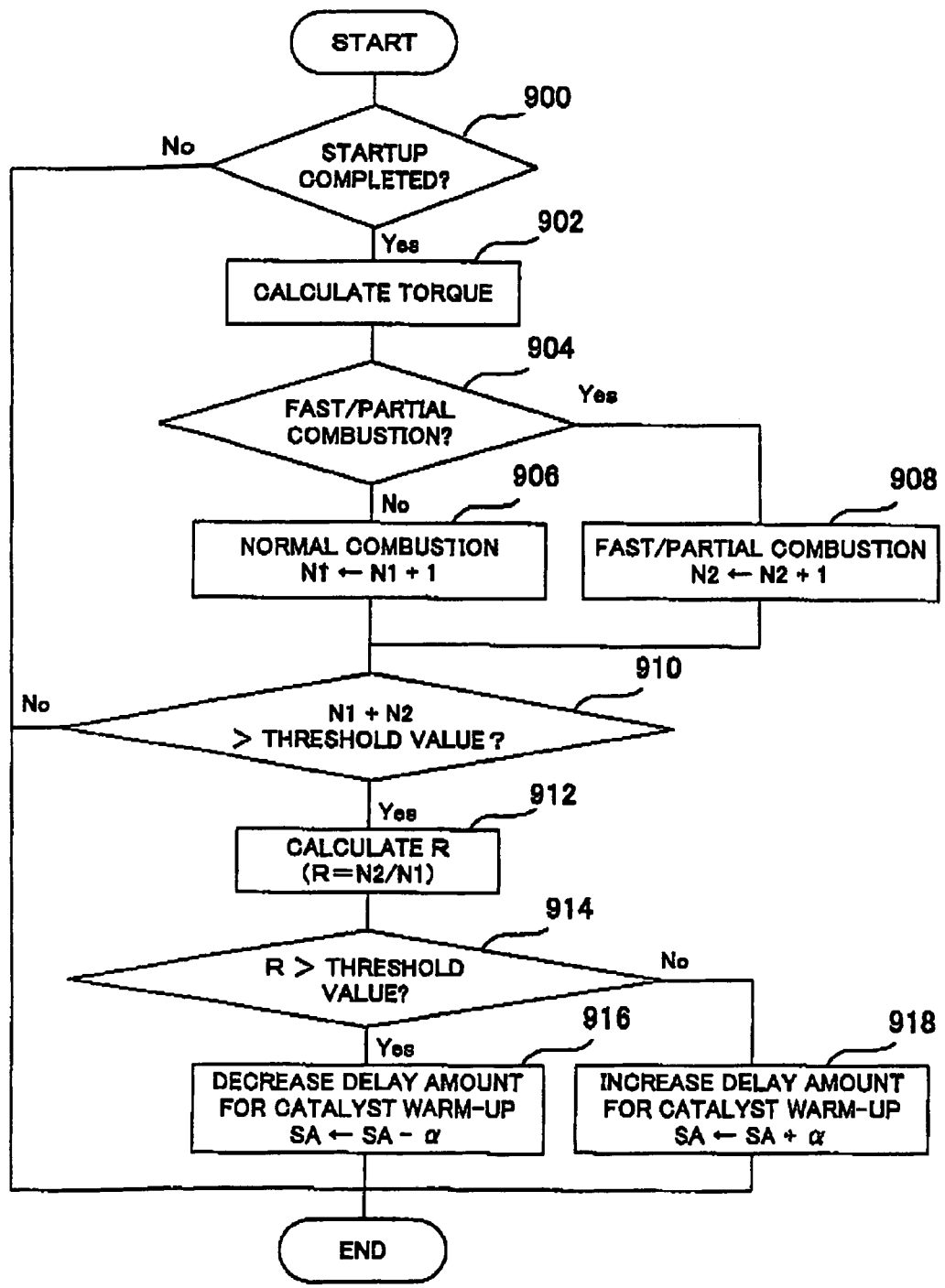
FIG. 17 is a flowchart illustrating a routine for cylinder-specific ignition timing delay control that is executed in accordance with a seventh embodiment of the present invention.

The internal combustion engine controller according to the seventh embodiment is implemented by causing the ECU 2 according to the first embodiment to perform a routine shown in FIG. 17 in place of the routines shown in FIGS. 3 through 5.

While cold fast idling is in progress, an ignition timing delay operation starts immediately after startup in order to raise the exhaust temperature and immediately raise the catalyst temperature to its activity temperature. However, combustion becomes unstable as described earlier when the ignition timing is delayed. If the ignition timing is excessively delayed, torque variation takes place to incur drivability degradation. It is therefore demanded that the amount of ignition timing delay be determined in such a manner as to meet both the drivability requirements and emission control requirements. However, it is difficult to determine the optimum delay amount because the critical delay amount, which does not incur torque variation, varies with the properties of this employed fuel. As described below, the present embodiment makes is possible to set the optimum delay amount be determining the margin of delay amount from the frequencies of partial combustion and fast combustion.

FIG. 17 is a flow chart illustrating a cylinder-specific ignition timing delay control routine that is executed by the ECU 2, which serves as an internal combustion engine controller according to the present embodiment. The cylinder-specific ignition timing delay control routine shown in FIG. 17 is executed for each cylinder on an individual expansion stroke basis (e.g., at 180 degree intervals for a 4-cylinder engine or at 120 degree intervals for a 6-cylinder engine) during cold fast idling during which combustion is likely to become unstable.

First of all, step 900 is performed to check whether the internal combustion engine is started up. When the internal combustion engine is started up, torque calculations are performed (step 902) according to the method that is described in conjunction with the first embodiment. The indicated torque (estimated indicated torque) is used which is calculated from an output signal supplied from the crank angle sensor 6 in accordance with the motion equation for each cylinder.

Next, step 904 is performed to determine the combustion status of the internal combustion engine from the torque calculation results, that is, to determine whether the combustion status is fast combustion, partial combustion, or proper combustion (normal combustion). Any of the methods described in conjunction wit the foregoing embodiments may be used to determine the combustion status of the internal combustion engine from torque. If it is found in step 904 that the combustion status is normal combustion, count N1 is incremented by one (step 906). If, on the other hand, it is found in step 904 that the combustion status is fast combustion or partial combustion, count N2 is incremented by one (step 908). The initial values for counts N1 and N2 are both 0. These counts reset to 0 when the cold fast idling state terminates.

In step 910, the sum of counts N1 and N2 is compared against a predetermined threshold value. The sum of counts N1 and N2 denotes the cycle count that is reached after the startup of a specific cylinder. The threshold value represents a cycle count that is appropriate for collecting sufficient data for delay amount calculation is processing steps 912 and beyond.

If it is found in step 910 that the sum of counts N1 and N2 is greater than the threshold value, step 912 is performed to calculate the ratio R (R=N2/N1) of fast combustion/partial combustion to normal combustion. In step 914, the fast/partial combustion ratio R is compared against a predetermined threshold value $R_0$. The threshold value $R_0$ is obtained through experiments. It represents the ratio of fast combustion/partial combustion to normal combustion that prevails when the drivability and emission control requirements are both met.

If the result of comparison in step 914 indicates that the fast/partial combustion ratio R is greater than the threshold value $R_0$, step 916 is performed to decrease the delay amount SA for catalyst warm-up. More specifically, a value obtained by subtracting a predetermined value α from the current delay amount SA is set as the delay amount setting for the next cycle. This ensures that the ignition timing for the next cycle is advanced for combustion stabilization purposes. Further, when combustion stabilizes, the ratio R of fast/partial combustion to normal combustion decreases.

If, on the other hand, the result of comparison in step 914 indicates that the fast/partial combustion ratio R is not greater than the threshold value $R_0$, step 918 is performed to increase the delay amount SA for catalyst warm-up. More specifically, a value obtained by adding a predetermined value α to the current delay amount SA is set as the delay amount setting for the next cycle. This ensure that the ignition timing for the next cycle is further delayed for emission improvement purposes. Further, since combustion becomes unstable due to an ignition timing delay, the ratio R of fast/partial combustion to normal combustion increases.

When the cylinder-specific ignition timing delay control routine described above is executed, the ratio R of fast/partial combustion to normal combustion converges to the threshold value $R_0$. Therefore, the controller according to the present embodiment makes it easy to optimize the ignition timing delay amount in such a manner as to meet both the drivability and emission control requirements.

The ignition timing delay amount can be calculated so as to determine the average value for all cylinders. However, the air amount, fuel amount, compression ratio, temperature, and other factors vary from one cylinder to another. Therefore, the combustion status also varies from one cylinder to another. It naturally means that the optimum critical delay amount varies with the cylinder. Therefore, when the frequency of fast/partial combustion is calculated for each cylinder as described in conjunction with the above embodiment to correct the ignition timing delay amount on an individual cylinder basis, the optimum delay amount can be provided for each cylinder.

In the embodiment described above, "ignition timing control means" is implemented when the ECU 2 performs the routine shown in FIG. 17.

Eighth Embodiment

An eighth embodiment of the present invention will now be described with reference to FIG. 18.

Figure 18:
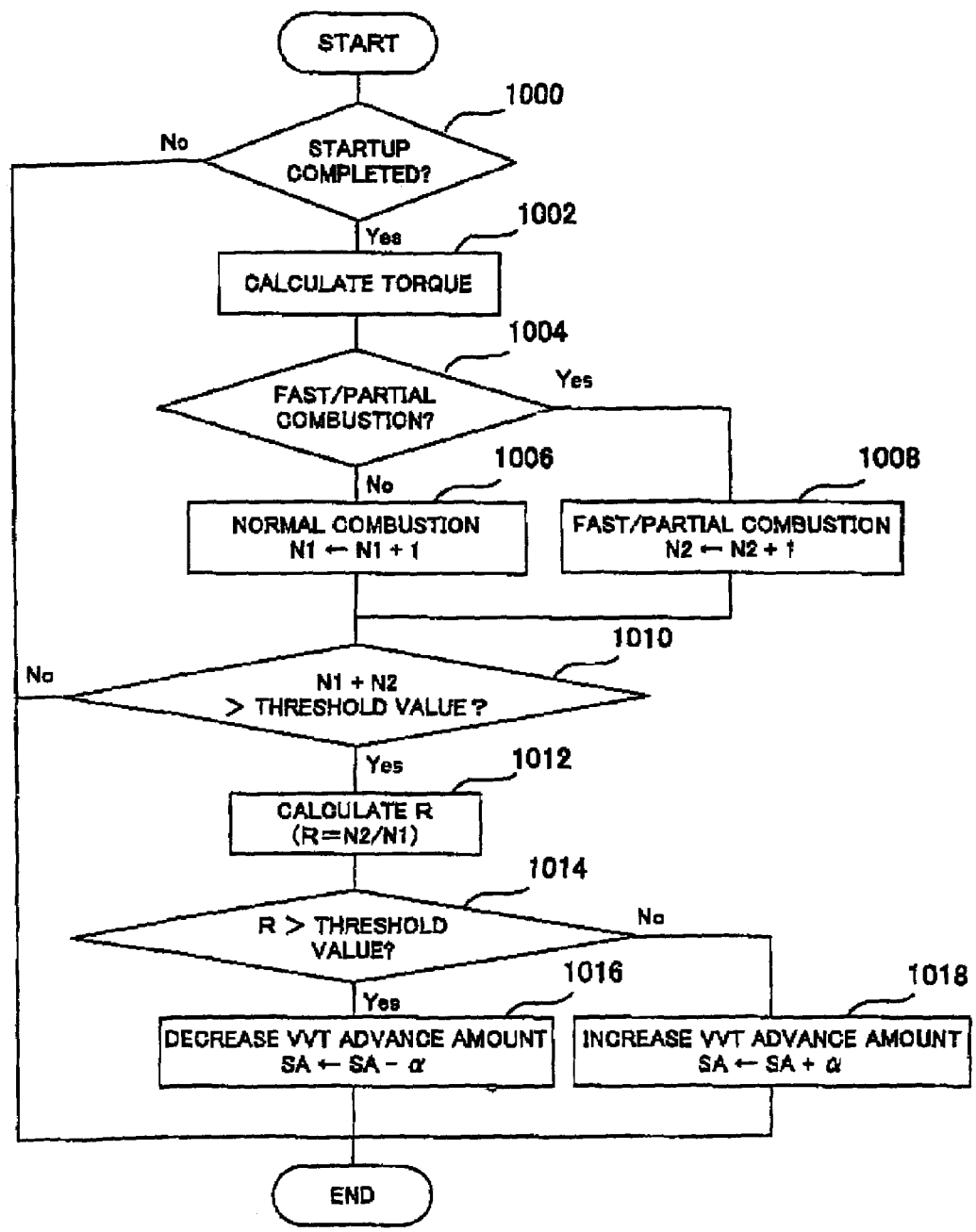
FIG. 18 is a flowchart illustrating a routine for cylinder-specific VVT advance control that is executed in accordance with an eighth embodiment of the present invention.

The internal combustion engine controller according to the eighth embodiment is implemented by causing the ECU 2 according to the first embodiment to perform a routine shown in FIG. 18 in place of the routines shown in FIGS. 3 through 5.

A variable valve timing mechanism (hereinafter referred to as the VVT) is known as a control mechanism that varies the intake valve open/close timing by changing the camshaft phase angle relative to the crankshaft. An internal combustion engine equipped with the VVT uses the VVT to advance the timing for opening the intake valve. The open period overlap between the intake valve and exhaust valve can then be increased to increase the internal EGR amount. As a result, the amount of NOx in the exhaust gas can be reduced. However, if the internal EGR among is excessively increased during cold fast idling during which combustion is unstable, combustion becomes more unstable so that torque variation incurs drivability degradation. It is therefore demanded that the amount of intake valve open timing advance (hereinafter referred to as the VVT advance amount) be determined to provide an internal EGR amount while satisfying both the drivability and NOx control requirements. However, the critical advance amount that does not incur torque variation changes with the properties of the employed fuel. It is therefore difficult to determine the optimum VVT advance amount. As described below, the present embodiment makes is possible to set the optimum VVT advance amount by determining the margin of VVT advance amount from the frequencies of partial combustion and fast combustion.

FIG. 18 is a flow chart illustrating a cylinder-specific VVT advance control routine that is executed by the ECU 2, which serves as an internal combustion engine controller according to the present embodiment. The cylinder specific VVT advance control routine shown in FIG. 18 is executed for each cylinder on an individual expansion stroke basis (e.g., at 180 degree intervals for a 4-cylinder engine or at 120 degree intervals for a 6-cylinder engine) during cold fast idling during which combustion is likely to become unstable. Processing steps 1000 through 1012 are not described herein because they are identical with processing steps 900 through 912 according to the seventh embodiment.

In step 1014, the fast/partial combustion ratio R is compared against a threshold value $R_0$. The threshold value $R_0$ is obtained through experiments. It represents the ratio of fast combustion/partial combustion to normal combustion that prevails when the drivability and NOx control requirements are both met.

If the result of comparison in step 1014 indicates that the fast/partial combustion ratio R is greater than the threshold value $R_0$, step 1016 is performed to decrease the VVT advance amount SA. More specifically, a value obtained by subtracting a predetermined value α from the current VVT advance amount SA is set as the VVT advance amount setting for the next cycle. This ensures that the intake valve open timing for the next cycle is delayed to reduce the internal EGR amount for combustion stabilization purposes. Further, when combustion stabilizes, the ratio R of fast/partial combustion to normal combustion decreases.

If, on the other hand, the result of comparison is step 1014 indicates that the fast/partial combustion ratio R is not greater than the threshold value $R_0$, step 1018 is performed to increase the VVT advance amount SA. More specifically, a value obtained by adding a predetermined value α to the current VVT advance amount SA is set as the VVT advance amount setting for the next cycle. This ensures that the intake valve open timing for the next cycle is further advanced to increase the internal EGR amount for NOx reduction purposes. Further, since combustion becomes unstable due to an increase in the internal EGR amount, the ratio R of fast/partial combustion to normal combustion increases.

When the cylinder-specific VVT advance control routine described above is executed, the ratio R of fast/partial combustion to normal combustion converges to the threshold value $R_0$. Therefore, the controller according to the present embodiment makes it easy to optimize the VVT advance amount in such a manner as to meet both the drivability and NOx control requirements.

The VVT advance amount can be calculated so as to determine the average value for all cylinders. However, the air amount, fuel amount, compression ratio, temperature, and other factors vary from one cylinder to another. Therefore, the combustion status also varies from one cylinder to another. It naturally means that the optimum critical advance amount varies with the cylinder. Therefore, when the frequency of fast/partial combustion is calculated for each cylinder as described in conjunction with the above embodiment to correct the VVT advance amount on an individual cylinder basis, the optimum VVT advance amount can be provided for each cylinder.

In the embodiment described above, "internal EGR amount control means" is implemented when the ECU 2 performs the routine shown in FIG. 18. In the embodiment described above, the internal EGR amount is controlled by allowing the VVT to control the intake valve open timing. Alternatively, however, the internal EGR amount may be controlled by allowing the VVT to control the exhaust valve close timing.

The major benefits of the present invention described above are summarized follows:

According to a first aspect of the present invention, when partial combustion occurs, the setting of a combustion status control parameter for the next cycle is adjusted to provide an increased degree of partial combustion. Therefore, fast combustion can be restrained in the next cycle. In other words, it is possible to restrain a combustion status change in which fast combustion follows partial combustion.

According to a second aspect of the present invention, when fast combustion occurs, the setting of a combustion status control parameter for the next cycle is adjusted to provide an increased degree of fast combustion. Therefore, partial combustion can be restrained in the next cycle. In other words, it is possible to restrain a combustion status change in which partial combustion follows fast combustion.

According to a third aspect of the present invention, it is possible to achieve combustion status detection in accordance with an output parameter that correlates with the engine torque for the purpose of accurately determining whether the engine combustion status is fast combustion or partial combustion.

According to a fourth aspect of the present invention, it is possible to avoid erroneously determining the engine combustion status (fast combustion or partial combustion) in accordance with stationary torque differences among cylinders.

According to a fifth aspect of the present invention, the combustion status is detected in accordance with the result of comparison between the currently detected value of an output parameter and the previously detected value of the output parameter. Therefore, it is possible to determine with increased accuracy and without regard to the absolute value accuracy of the detected values whether the engine combustion status is fast combustion or partial combustion.

According to a sixth aspect of the present invention, when the detected value of an output parameter correlating with the engine torque is below a predetermined range, the setting of an output parameter magnitude control parameter for the next cycle is adjusted to decrease the output parameter. It is therefore possible to restrain the torque from suddenly changing in the next cycle so as to increase the output parameter. Further, when the detected value of the output parameter is above the predetermined range, the setting of the control parameter for the next cycle is adjusted to increase the output parameter. It is therefore possible to restrain the torque from suddenly changing in the next cycle so as to decrease the output parameter. In other words, it is possible to restrain a combustion status change in which partial combustion follows fast combustion or fast combustion follows partial combustion.

According to a seventh aspect of the present invention, the setting of a control parameter for the next cycle is adjusted only when the degree of variation in the detected values of an output parameter in a plurality of previous cycles is greater than predefined. It is therefore possible to avoid unnecessary control parameter adjustments in a situation where combustion status variation does not constitute any problem.

According to an eighth aspect of the present invention, the setting of a control parameter for the next cycle is adjusted when there is a negative correlation among the detected values of an output parameter. Therefore, control parameter adjustments can be made only in a situation where fast combustion and partial combustion alternately occur.

According to a ninth aspect of the present invention, if a main control parameter is above a predetermined adjustment range, the setting of another control parameter for the next cycle is adjusted. Therefore, an adequate adjustment margin remains, making it possible to properly restrain combustion status variation.

According to a tenth aspect of the present invention, if the ignition timing advance exceeds a predetermined degree in a situation where ignition timing delay control is exercised for catalyst warm-up, the fuel injection amount setting for the next cycle is increased instead of further advancing the ignition timing. It is therefore possible to restrain combustion status variation while continuously exercising ignition timing delay control for catalyst warm-up.

If there are stationary torque differences among cylinders, inter-cylinder stationary differences arise in the detected value of an output parameter. According to an eleventh aspect of the present invention, however, the inter-cylinder stationary differences in the detected value of an output parameter are reduced by compensating for the torque differences among the cylinders. This ensures that when the detected value of an output parameter is compared against a predetermined range, an erroneous judgment arising out of inter-cylinder torque differences can be avoided. As a result, it is possible to restrain combustion status variation by making accurate control parameter adjustments.

According to a twelfth aspect of the present invention, the detected value of an output parameter is rendered relative by a previously detected value of the output parameter. Any error contained in the detected value is offset when the detected value is rendered relative. When the detected value of the output parameter is compared against a predetermined range, an erroneous judgment arising out of the reliability of output parameter value can therefore be avoided. As a result, it is possible to restrain combustion status variation by making accurate control parameter adjustments.

The fuel properties affect the combustion status. If heavy fuel is used, unstable combustion is likely to occur, thereby causing the combustion status to vary. In such an instance, there is a negative correlation among torque values in a plurality of previous cycles. According to a the thirteenth aspect of the present invention, it is possible to accurately determine the fuel properties by viewing the correlation among the detected values of an output parameter in a plurality of previous cycles.

When the fuel properties change, the combustion status varies. The combustion status can be expressed in terms of deviation between the currently detected value of an output parameter and the average of previously detected values of the output parameter. According to a fourteenth aspect of the present invention, when the ignition timing setting for the next cycle is adjusted in accordance with such deviation, it is possible to accurately determine the fuel properties in accordance with the amount of such adjustment.

According to a fifteenth aspect of the present invention, it is possible to exercise catalyst warm-up control in accordance with the combustion status. When, for instance, there is no negative correlation so that the combustion status is stable, the catalyst can be warmed up early by increasing the delay amount of ignition timing.

According to a sixteenth aspect of the present invention, it is possible to control the internal EGR amount in accordance with the combustion status. When, for instance, there is no negative correlation so that the combustion status is stable, the amount of NOx can be decreased by increasing the internal EGR amount.

The invention claimed is:

1. An internal combustion engine controller, comprising:
   combustion status detection means for detecting the combustion status of each cylinder of an internal combustion engine in a steady state;
   combustion status variation means for judging an excessive combustion variation for an individual cylinder; and
   control parameter adjustment means for adjusting a control parameter concerning the combustion status after an excessive combustion variation has been judged;
   wherein, when the detected combustion status for the individual cylinder is a partial combustion state, said control parameter adjustment means adjusts a setting of said control parameter for the next cycle of the individual cylinder so as to restrain fast combustion from occurring in the next cycle by delaying ignition timing for the next cycle.

2. An internal combustion engine controller, comprising:
   combustion status detection means for detecting the combustion status of each cylinder of an internal combustion engine in a steady state;
   combustion status variation means for judging an excessive combustion variation for an individual cylinder; and
   control parameter adjustment means for adjusting a control parameter concerning the combustion status after an excessive combustion variation has been judged;
   wherein, when the detected combustion status for the individual cylinder is a fast combustion state, said control parameter adjustment means adjusts a setting of said control parameter for the next cycle of the individual cylinder so as to restrain partial combustion from occurring in the next cycle by advancing ignition timing for the next cycle.

3. The internal combustion engine controller according to claim 1, wherein said combustion status detection means detects the combustion status in accordance with an output parameter that correlates with engine torque.

4. The internal combustion engine controller according to claim 3, further comprising:
   torque difference compensation means for adjusting the torque of each cylinder so as to reduce stationary torque differences among cylinders;
   wherein said combustion status detection means detects the combustion status in accordance with said output parameter after the torque differences among cylinders are compensated for by said torque difference compensation means.

5. The internal combustion engine controller according to claim 3, wherein said combustion status detection means detects the combustion status in accordance with the result of comparison between the currently detected value of said output parameter and the previously detected value of said output parameter.

6. An internal combustion engine controller, comprising:
   output parameter detection means for detecting an output parameter for each cylinder of an internal combustion engine that correlates with engine torque in a steady state;
   variation judgment means for judging the degree of detected value variation of said output parameter in a plurality of previous cycles of the cylinders; and
   control parameter adjustment means for adjusting a control parameter concerning the magnitude of said output parameter after an excessive variation for an individual cylinder is judged by the variation judgment means;
   wherein, when the detected value of said output parameter is below a predetermined range, said control parameter adjustment means adjusts a setting of said control parameter for the next cycle of the individual cylinder so as to increase the value of said output parameter without exceeding the predetermined range by delaying ignition timing for the next cycle; and
   wherein, when the detected value of said output parameter is above said predetermined range, said control parameter adjustment means adjusts the setting of said control parameter for the next cycle of the individual cylinder so as to decrease the value of said output parameter without exceeding the predetermined range by advancing ignition timing for the next cycle.

7. The internal combustion engine controller according to claim 6,
   wherein said variation judgment means judges the degree of variation in accordance with a correlation among the detected values of said output parameter in a plurality of previous cycles; and
   wherein said control parameter adjustment means adjusts the setting of said control parameter for the next cycle when there is a negative correlation among the detected values of said output parameter.

8. The internal combustion engine controller according to claim 6, wherein said control parameter adjustment means can adjust at least two control parameters including a main control parameter, adjusts the setting of said main control parameter for the next cycle when said main control parameter is within a predetermined range, and adjusts the setting of another control parameter for the next cycle when said main control parameter is out of a predetermined range.

9. The internal combustion engine controller according to claim 8, further comprising:
   operating status judgment means for judging whether ignition timing delay control for catalyst warm-up is being exercised;
   wherein, when said ignition timing delay control is being exercised, said control parameter adjustment means changes an ignition timing setting for the next cycle to delay the ignition timing if the detected value of said output parameter is outside said predetermined range so as to decrease the torque, changes the ignition timing setting for the next cycle to advance the ignition timing until the advance of said ignition timing exceeds a predetermined degree if the detected value of said output parameter is outside said predetermined range so as to increase the torque, and increases a fuel injection amount setting for the next cycle if the advance of said ignition timing exceeds said predetermined degree.

10. The internal combustion engine controller according to claim 6, further comprising:

torque difference compensation means for adjusting the torque of each cylinder so as to reduce stationary torque differences among cylinders;

wherein said control parameter adjustment means adjusts the setting of said control parameter for the next cycle in accordance with the detected value of said output parameter after the torque differences among the cylinders are compensated for by said torque difference compensation means.

11. The internal combustion engine controller according to claim 6, wherein said control parameter adjustment means renders the detected value of said output parameter relative by using a previously detected value and adjusts the setting of said control parameter for the next cycle in accordance with the resultant relative detected value.

12. The internal combustion engine controller according to claim 7, further comprising fuel property determination means for determining the fuel properties from the correlation among the detected values of said output parameter in a plurality of previous cycles.

13. The internal combustion engine controller according to claim 6, wherein said control parameter is an ignition timing, and said control parameter adjustment means is configured so as to adjust the setting of said ignition timing for the next cycle in accordance with a deviation between the currently detected value of said output parameter and an average of previously detected values of said output parameter; and wherein said internal combustion engine controller further comprises fuel property determination means for determining fuel properties from the amount of said ignition timing that is adjusted by said control parameter adjustment means.

14. The internal combustion engine controller according to claim 7, further comprising ignition timing control means for determining a delay amount of ignition timing for catalyst warm-up from the correlation among the detected values of said output parameter in a plurality of previous cycles.

15. The internal combustion engine controller according to claim 7, further comprising internal EGR amount control means for determining an internal EGR amount of an engine from the correlation among the detected values of said output parameter in a plurality of previous cycles.

16. The internal combustion engine controller according to claim 2, wherein said combustion status detection means detects the combustion status in accordance with an output parameter that correlates with engine torque.

* * * * *